United States Patent
McCourt et al.

(10) Patent No.: US 11,804,216 B2
(45) Date of Patent: Oct. 31, 2023

(54) GENERATING TRAINING DATASETS FOR A SUPERVISED LEARNING TOPIC MODEL FROM OUTPUTS OF A DISCOVERY TOPIC MODEL

(71) Applicant: Invoca, Inc., Santa Barbara, CA (US)

(72) Inventors: Michael McCourt, Santa Barbara, CA (US); Anoop Praturu, Santa Barbara, CA (US)

(73) Assignee: Invoca, Inc., Santa Barbara, CA (US)

( * ) Notice: Subject to any disclaimer, the term of this patent is extended or adjusted under 35 U.S.C. 154(b) by 0 days.

(21) Appl. No.: 17/817,228

(22) Filed: Aug. 3, 2022

(65) Prior Publication Data
US 2022/0383863 A1    Dec. 1, 2022

Related U.S. Application Data

(63) Continuation of application No. 16/996,653, filed on Aug. 18, 2020, now Pat. No. 11,410,644.

(Continued)

(51) Int. Cl.
G10L 15/22        (2006.01)
G10L 15/18        (2013.01)
(Continued)

(52) U.S. Cl.
CPC .......... *G10L 15/1815* (2013.01); *G06N 5/04* (2013.01); *G06N 20/00* (2019.01); *G10L 15/063* (2013.01); *G10L 15/197* (2013.01); *G10L 15/22* (2013.01)

(58) Field of Classification Search
CPC ... G10L 15/815; G10L 15/063; G10L 15/197; G10L 15/22
(Continued)

(56) References Cited

U.S. PATENT DOCUMENTS 8,165,985 B2    4/2012 Stefik
8,645,298 B2    2/2014 Hennig
(Continued)

FOREIGN PATENT DOCUMENTS

DE    69932044    11/2006

OTHER PUBLICATIONS

K. N. Haque, R. Rana and B. W. Schuller, "High-Fidelity Audio Generation and Representation Learning With Guided Adversarial Autoencoder," in IEEE Access, vol. 8, pp. 223509-223528, 2020, doi: 10.1109/ACCESS.2020.3040797. (Year: 2020).*

(Continued)

*Primary Examiner* — Bharatkumar S Shah
(74) *Attorney, Agent, or Firm* — Baker Botts L.L.P.

(57) ABSTRACT

Systems and methods for generating training data for a supervised topic modeling system from outputs of a topic discovery model are described herein. In an embodiment, a system receives a plurality of digitally stored call transcripts and, using a topic model, generates an output which identifies a plurality of topics represented in the plurality of digitally stored call transcripts. Using the output of the topic model, the system generates an input dataset for a supervised learning model by identify a first subset of the plurality of digitally stored call transcripts that include the particular topic, storing a positive value for the first subset, identifying a second subset that do not include the particular topic, and storing a negative value for the second subset. The input training dataset is then used to train a supervised learning model.

14 Claims, 11 Drawing Sheets

Related U.S. Application Data

(60) Provisional application No. 62/980,092, filed on Feb. 21, 2020, provisional application No. 62/923,323, filed on Oct. 18, 2019.

(51) Int. Cl.
  *G06N 20/00* (2019.01)
  *G10L 15/197* (2013.01)
  *G10L 15/06* (2013.01)
  *G06N 5/04* (2023.01)

(58) Field of Classification Search
  USPC .......................................................... 704/232
  See application file for complete search history.

(56) References Cited

U.S. PATENT DOCUMENTS

| | | | |
|---|---|---|---|
| 8,650,143 B2 | 2/2014 | Fano | |
| 8,706,678 B2 | 4/2014 | Stefik | |
| 8,977,540 B2 | 3/2015 | Yasin | |
| 9,177,262 B2 | 11/2015 | Lightner | |
| 9,626,623 B2 | 4/2017 | Lightner | |
| 9,697,474 B2 | 7/2017 | Liu | |
| 10,666,792 B1 * | 5/2020 | Marzuoli | H04M 3/436 |
| 10,847,140 B1 * | 11/2020 | Conner | G10L 15/1815 |
| 2012/0269185 A1 | 10/2012 | Castleman et al. | |
| 2014/0156571 A1 | 6/2014 | Hennig | |
| 2015/0032448 A1 | 1/2015 | Wasserblat | |
| 2017/0024664 A1 | 1/2017 | Xiong | |
| 2017/0109633 A1 | 4/2017 | Bai | |
| 2017/0286837 A1 | 10/2017 | Lightner | |
| 2018/0276561 A1 | 9/2018 | Pasternack | |
| 2018/0293507 A1 | 10/2018 | Lian | |
| 2018/0309873 A1 | 10/2018 | Raanani et al. | |
| 2020/0050946 A1 | 2/2020 | Lecue | |
| 2020/0074312 A1 | 3/2020 | Liang | |
| 2020/0311739 A1 | 10/2020 | Chopra | |

OTHER PUBLICATIONS

N. Ebadi, B. Lwowski, M. Jaloli and P. Rad, "Implicit Life Event Discovery From Call Transcripts Using Temporal Input Transformation Network," in IEEE Access, vol. 7, pp. 172178-172189, 2019, doi: 10.1109/ACCESS.2019.2954884. (Year: 2019).*

Canadian Office Action for CA Application No. 3,083,303, dated Apr. 6, 2022, 4 pages.

N. Ebadi, B. Lwowski, M. Jaloli and P. Rad, "Implicit Life Event Discovery From Call Transcripts Using Temporal Input Transformation Network," in IEEE Access, vol. 7, pp. 172178-172189, 2019.

M. Sherman and Y. Liu, "Using hidden Markov models for topic segmentation of meeting transcripts," 2008 IEEE Spoken Language Technology Workshop, pp. 185-188, 2008.

* cited by examiner

US 11,804,216 B2

GENERATING TRAINING DATASETS FOR A SUPERVISED LEARNING TOPIC MODEL FROM OUTPUTS OF A DISCOVERY TOPIC MODEL

BENEFIT CLAIM

This application claims the benefit under 35 U.S.C. § 120 as a continuation of application Ser. No. 16/996,653, filed Aug. 18, 2020, which claims the benefit of U.S. provisional application 62/923,323, filed Oct. 18, 2019 and claims the benefit of U.S. provisional application 62/980,092, filed Feb. 21, 2020, the entire contents of which are hereby incorporated by reference for all purposes as if fully set forth herein.

TECHNICAL FIELD

One technical field of the disclosure is computer-implemented artificial intelligence models that are programmed to derive semantics such as topics from a natural language dataset such as a transcript of a voice call communicated between a calling person and a called entity. Another technical field of the disclosure is improvements to Bayesian Belief Network models and model generation techniques.

BACKGROUND

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Topic modeling in written and verbal communications can be extremely useful for grouping a large number of communications for review, analysis, or intervention. The output of a topic model includes a plurality of identified topics, each of which comprising a probability distribution of words for that topic. The output may additionally identify which of the plurality of topics was spoken on a particular call corresponding to a call transcript.

Topic discovery models are usually generated as unsupervised machine learning models. Unsupervised machine learning models can be extremely useful for categorizing unlabeled data. For instance, if a system receives a thousand call transcripts, a supervised machine learning topic model could only be run if each call transcript was previously labeled with topic information. A topic discovery model, on the other hand, can identify a plurality of topics from the call transcripts and generate probability distributions for a plurality of topics, each comprising a plurality of words included in the topic.

While topic discovery models are generally great for identifying a plurality of topics discussed on a plurality of calls, topic discovery models tend to be less useful in determining, from a particular call transcript, whether a topic was discussed on a call corresponding the particular call transcript. If a company needs to review all incoming repair calls or all sales calls, the topic discovery model is less useful in determining if the incoming calls are repair calls or sales calls. Additionally, many topics identified through a discovery model will be of limited use. Identifying said topics in a call transcript may thus be an unnecessary expenditure of processing power.

In order to efficiently evaluate call transcripts to determine whether particular topics are discussed on calls, a supervised machine learning system is more beneficial as a supervised model can approximate the outputs from the unsupervised model, allowing for faster and more efficient computation, while also translating the topic model's probabilistic outputs into definite outcomes which are easier to interpret. Yet, as mentioned above, supervised machine learning systems require labeled training data which, for a large number of incoming calls, could be physically intractable to generate. One solution is to use the output of a topic discovery model to train a supervised machine learning system. The issue with this approach is that supervised machine learning systems require binary labels. A call either includes a topic or does not include the topic. Yet a discovery model does not provide binary outputs. Instead, discovery models solve for probability distributions over topics.

Training a supervised machine learning system from the output of a discovery model is difficult for a few reasons. First, most supervised machine learning systems have little to no tolerance for uncertainty or errors. If a basic threshold of 75% probability that a topic was discussed is used to label call transcripts, then 25% of the call transcripts may be mislabeled, thereby causing the supervised machine learning system to be trained with incorrect data. Second, discovery models generally create probabilities on a word level, not on a call level. These systems determine probabilities that a word is sampled from a particular topic. Yet a low probability on words may not indicate an absence of topics, especially when the topic is discussed briefly on a long call.

Thus, there is a need for a method that accurately converts the output of a discovery model into a training dataset for a supervised machine learning system.

DETAILED DESCRIPTION

Figure 1:
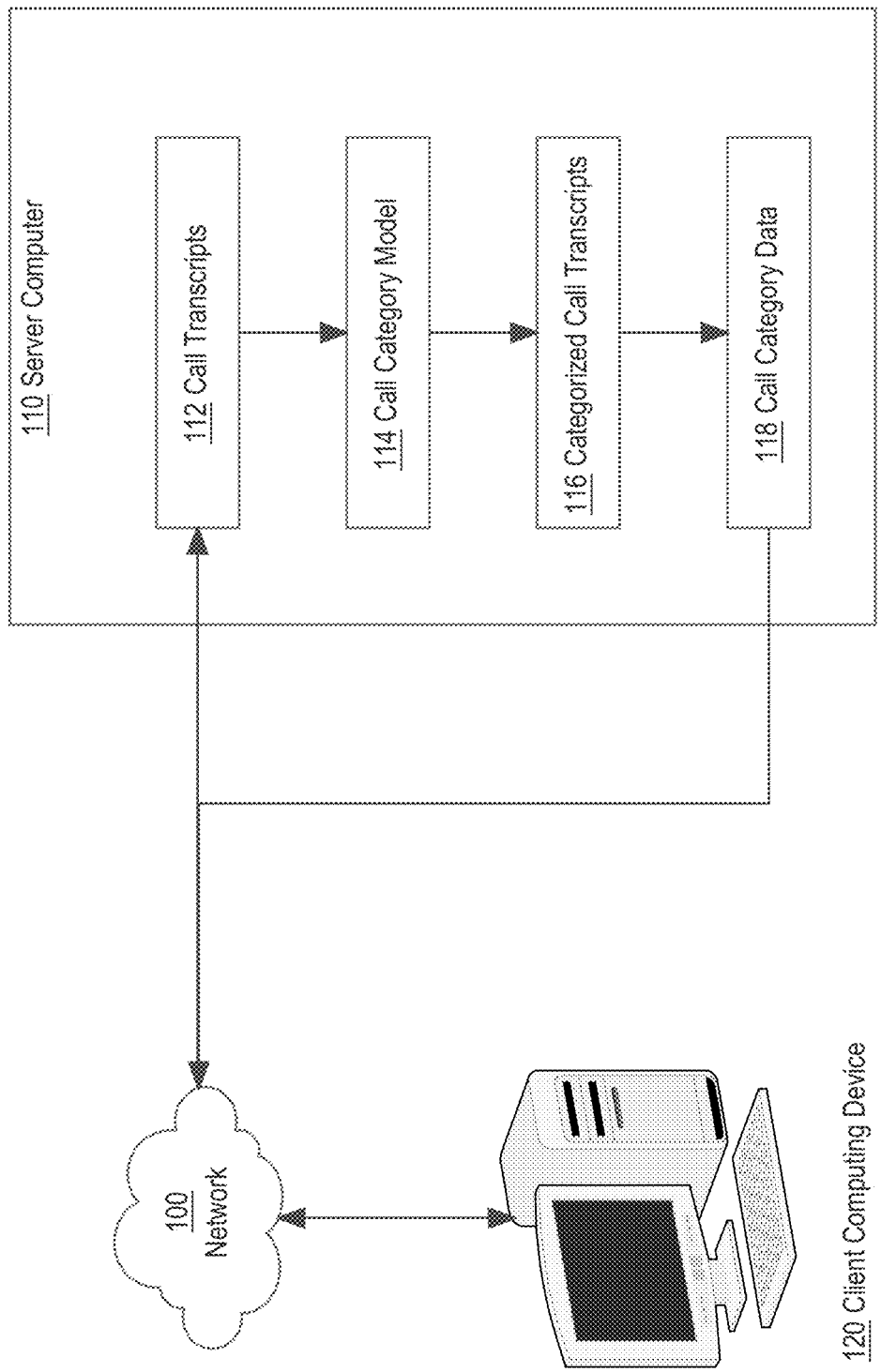
FIG. 1 depicts an example distributed computer system for performing topic modeling on call transcripts.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1.0 GENERAL OVERVIEW
2.0 STRUCTURAL OVERVIEW
3.0 FUNCTIONAL OVERVIEW
4.0 TOPIC MODELS
   4.1 LATENT DIRICHLET ALLOCATION TOPIC MODEL
   4.2 IMPROVED TOPIC MODEL FOR CALLS
   4.3 IMPROVED TOPIC MODEL WITH PARTY SEGREGATION
   4.4 TOPIC MODEL GENERATOR
5.0 TOPIC DISPLAY
6.0 BROAD AND SCRIPTED TOPIC IDENTIFICATION
7.0 TRAINING DATASET GENERATION
8.0 IMPLEMENTATION EXAMPLE—HARDWARE OVERVIEW 1.0 General Overview Improvements to computer-implemented topic modeling are described herein for use in artificial intelligence models that are programmed to derive semantics such as topics from a natural language dataset such as a transcript of a voice call communicated between a calling person and a called entity. The disclosure also addresses improvements to Bayesian Belief Network models and post-processing techniques.

In an embodiment, a computer system programmed in accordance with the methods and algorithms of this disclosure generates an input training dataset for a supervised machine learning system using the output of a topic discovery model. To create the input training dataset, the system programmatically determines whether each call transcript should be identified as including a particular topic, identified as not including a particular topic, or not used for the input training dataset. The system identifies the call transcripts that include or do not include the particular topic by comparing a proportion of words in the call transcripts that exist in the particular topic with a threshold value comprising an a priori proportion value multiplied by a value corresponding to the call length. The system may additionally evaluate other criteria, such as criteria relating to a total number of words in the call transcript that exist in a particular topic. Transcripts that meet criteria for including the particular topic are stored as "true" transcripts while transcripts that meet different criteria for not including the particular topic are stored as "false" transcripts. The remaining transcripts are identified as "unknown" and are not used in the input training dataset. The input training dataset is then used to train a supervised machine learning system which can then be used to compute a probability that the particular topic was discussed on an incoming call.

In an embodiment, a method comprises receiving a plurality of digitally stored call transcripts that have been prepared from digitally recorded voice calls; using a topic model of an artificial intelligence machine learning system, the topic model modeling words of a call as a function of one or more word distributions for each topic of a plurality of topics, generating an output of the topic model which identifies the plurality of topics represented in the plurality of digitally stored call transcripts; using the output of the topic model, generating an input dataset for a supervised learning model by performing: identifying, based, at least in part, on the output of the topic model, a first subset of the plurality of digitally stored call transcripts that include the particular topic; identifying, based, at least in part, on the output of the topic model, a second subset of the plurality of digitally stored call transcripts that do not include the particular topic; storing a positive output value for the first subset of the plurality of digitally stored call transcripts; storing a negative output value for the second subset of the plurality of digitally stored call transcript; training the supervised learning model using the generated input dataset, wherein the supervised learning model is configured to compute, for a new digitally stored call transcript, a probability that the particular topic was discussed during a digitally recorded voice call corresponding to the new digitally stored call transcript.

2.0 Structural Overview

FIG. 1 depicts an example distributed computer system for performing topic modeling on call transcripts. FIG. 1, and the other drawing figures and all of the description and claims in this disclosure, are intended to present, disclose and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of automated, programmatic determination of topics in digitally stored natural language texts or transcripts. Every step or operation that is functionally described in the disclosure is intended for implementation using programmed instructions that are executed by computer. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a server computer 110 is communicatively coupled to client computing device 120 over network 100. Network 100 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, client computing device 120, and other elements of the system may each comprise an interface compatible with the network 100 and are programmed or configured to use standardized protocols for communication across the networks such as TCP/IP, Bluetooth, and higher-layer protocols such as HTTP, TLS, and the like.

The client computing device 120 is a computer that includes hardware capable of communicatively coupling the device to one or more server computer, such as server computer 110, over one or more service provides. For example, client computing device 120 may include a network card that communicates with server computer 110 through a home or office wireless router (not illustrated in FIG. 1) coupled to an internet service provider. The client computing device 120 may be a smart phone, personal computer, tabled computing device, PDA, laptop, or any other computing device capable of transmitting and receiving information and performing the functions described herein.

The server computer 110 may be implemented using a server-class computer or other computer having one or more processor cores, co-processors, or other computers. The server computer 110 may be a physical server computer and/or virtual server instance stored in a data center, such as through cloud computing.

In an embodiment, server computer 110 receives call transcripts 112 over network 100 from client computing device 120. The call transcripts may comprise an electronic digital representation of a verbal transcription of calls between two or more parties. For example, a call transcript for a call dealership may comprise written dialogue between an agent and a customer that has been transcribed from an audio conversation between the agent and the customer. The call transcripts may include data labeling portions of the dialogue with identifiers of the parties and/or party types. For example, when used for conversations between a customer and a goods or services provider, the portions of the dialogue may be labeled based on whether the portions were spoken by the customer or by an agent of the goods or services provider.

In an embodiment, server computer 110 stores a topic model. The topic model comprises computer readable instructions which, when executed by one or more processors, cause the server computer 110 to compute one or more output topics based on input call transcripts. The topic model may comprise a mathematical model that is trained at the server computer 110 or trained at an external computing device and provided to server computer 110.

Call transcripts are evaluated by the server computer 110 by using the call transcripts as input into the topic model 114. Using the topic model, as described further herein, the server computer 110 identifies one or more topics for the call transcripts. The server computer then stores the call transcripts with data identifying the one or more topics. In an embodiment, further data is stored relating to the one or more topics. For example, the server computer 110 may store data identifying a length of a portion of a call corresponding to a particular topic, such as multiple topics are discussed during a single call. In some embodiments, the server computer removes the call transcripts from storage after a topic has been identified. The server computer may instead store the call topics and summary information from the call transcripts.

In an embodiment, the server computer generates topic data 118 from a plurality of categorized call transcripts. The topic data 118 may comprise aggregated information from a plurality of categorized call transcripts. For example, the topic data may identify each of a plurality of topics, average length of time spent on each topic per call, total amount of time spent on each topic, and/or other aggregated information regarding the call transcripts or modeled topics.

For purposes of illustrating a clear example, FIG. 1 shows a limited number of instances of certain functional elements. However, in other embodiments, there may be any number of such elements. For example, embodiments with multiple client computing devices may include a first client computing device or first plurality of client computing devices which sends the call transcripts to the server computer and a second client computing device or second plurality of client computing devices which receives the topic data from the server computer. Further, the server computer 110 may be implemented using two or more processor cores, clusters, or instances of physical machines or virtual machines, configured in a discreet location or co-located with other elements in a datacenter, share computing facility, or cloud computing facility.

3.0 Functional Overview

Figure 2:
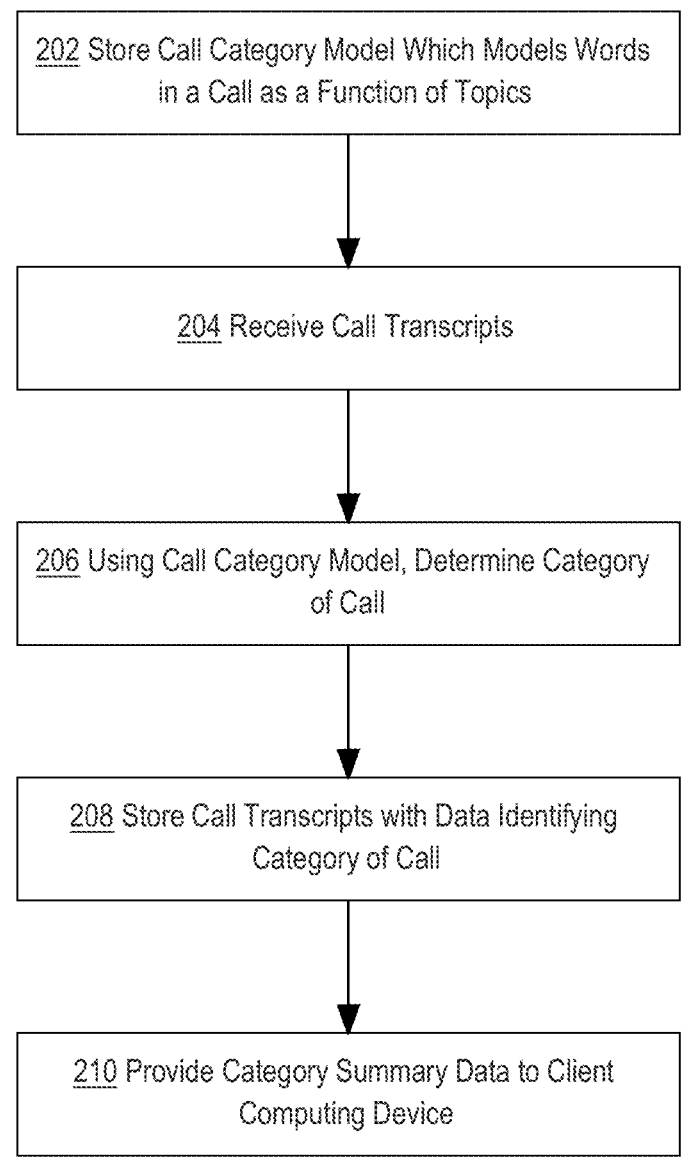
FIG. 2 depicts an example method of using a topic model to identify topics of audio dialogues based on call transcripts.

FIG. 2 depicts an example method of using a topic model to identify topics of audio dialogues based on call transcripts.

At step 202, a topic model is stored which models words as a function of topics. For example, a topic model may model specific words spoken on a plurality of calls by identifying a latent set of one or more themes or topics which are shared across all calls. Examples of the topic model are described further herein. The server computer may store a model trained for a particular customer using previously received transcripts. The training of the topic model may be performed at the server computer and/or at an external computing device.

At step 204, call transcripts for a call are received. The call transcripts may comprise electronic digital representations of verbal transcriptions of the call. For example, the call transcripts may include transcribed dialogue from a telephonic communication. The transcribed dialogue may uniquely identify the different parties to the conversation. In an embodiment, the different parties are identified as a person type, such as agent and customer. Tags may be placed in the transcriptions of the call which identify, for a block of dialogue, the party or party type which spoke the block of dialogue in the call. The call transcripts may additionally comprise metadata, such as timestamps for one or more blocks of text, total call length, or other call information. Receiving the call transcripts may comprise receiving the call transcripts from an external computing device and/or generating call transcripts from an audio file received from an external computing device and receiving the call transcripts from memory of the server computer.

At step 206, the topic model is used to determine a topic of the call. For instance, the server computer may execute instructions to run the trained topic model using the call transcript as input to identify one or more topics discussed in the call. In an embodiment, the call transcript is augmented by the server computer prior to execution of the topic model to transform the call transcript into data which can be read by the topic model. The transformations may include editing the call transcription to change its form so it can be read by the topic model, such as by removing pieces of metadata, changing the file structure of the call transcripts, or splitting the call transcript based on person type, as described further herein.

In an embodiment, determining a topic of the call includes one or more post-processing steps. For example, the topic model may determine, for each word, probabilities of different topics given the word. The server computer may execute one or more post-processing steps to determine, from these probabilities, whether a topic was discussed during a call. The post-processing steps may include aggregating probabilities and/or evaluating one or more criteria. For example, the server computer may determine that a topic was discussed during a call if greater than a threshold number of words spoken during the call had greater than a threshold probability of being spoken given a particular topic. As a practical example, if more than fifteen words were spoken that had over 60% probability of being spoken given a particular topic, the server computer may determine that the particular topic was discussed during the call. The rules may vary based on implementation and may include other thresholds, such as percentage of words spoken in a particular time/word window, or other types of rules, such as rules which use aggregated values and/or maximum percentage values. The rules and thresholds may be configured in advance generally and/or for a specific implementation.

At step 208, the call transcripts are stored with data identifying the topic of the call. For example, the server computer may store the call transcripts with metadata identifying one or more topics discussed during the call as identified by the topic model. The server computer may additionally store metadata identifying other attributes of the call, such as length of time spent on each topic. In an embodiment, the server computer separately stores the topic data. For example, the server computer may increment a call topic value by one for each call in which the topic was discussed. Additionally or alternatively, the server computer may store a data record for each call transcript which identifies at least one or more call topics of the call. The data record may additionally identify a date and/or time of the call, a length of the call, a length of time spent discussing each topic, an outcome of the call, or other data relating to the call and/or topic.

At step 210, topic summary data is provided to a client computing device. For example, the server computer may cause display of a graphical user interface on the client computing device which displays aggregated topic summary data. Example displays are described further herein. The server computer may additionally or alternatively provide call transcripts with topic identifiers and/or data records for each of a plurality of call transcripts which identify at least one or more call topics of the call.

4.0 Topic Models

Topic modeling may be improved using one or more of the methods described herein. While improvements are sometimes described depicted together, a person of skill in the art would understand that the improvements may be independently applied to the topic model unless the improvements are specified to be dependent on previous improvements. For example, the party segregation improvements described in section 4.2 may be used on the word side of the topic model without the improvements to the topic side of the topic model described in section 4.2.

The topic models described herein comprise mathematical models described at a level that a person of skill in the art would be able to make and use the model without undue experimentation. Where improvements to the underlying mathematics of the models are described, sufficient equations are provided to allow one of skill in the art to make and use a model with the improvements.

Generally, the topics comprise probabilistic models for each of the words spoken on every call. These probabilities are modeled as functions of the topics relevant to the application, the vocabulary associated with each topic, and of how prevalent each topic is. In order to infer the topics from observed data, any standard technique, such as Markov-chain Monte Carlo, variational inference, maximum likelihood estimation, or other inference techniques, may be used to estimate the model parameters.

4.1 Latent Dirichlet Allocation Topic Model

Figure 3:
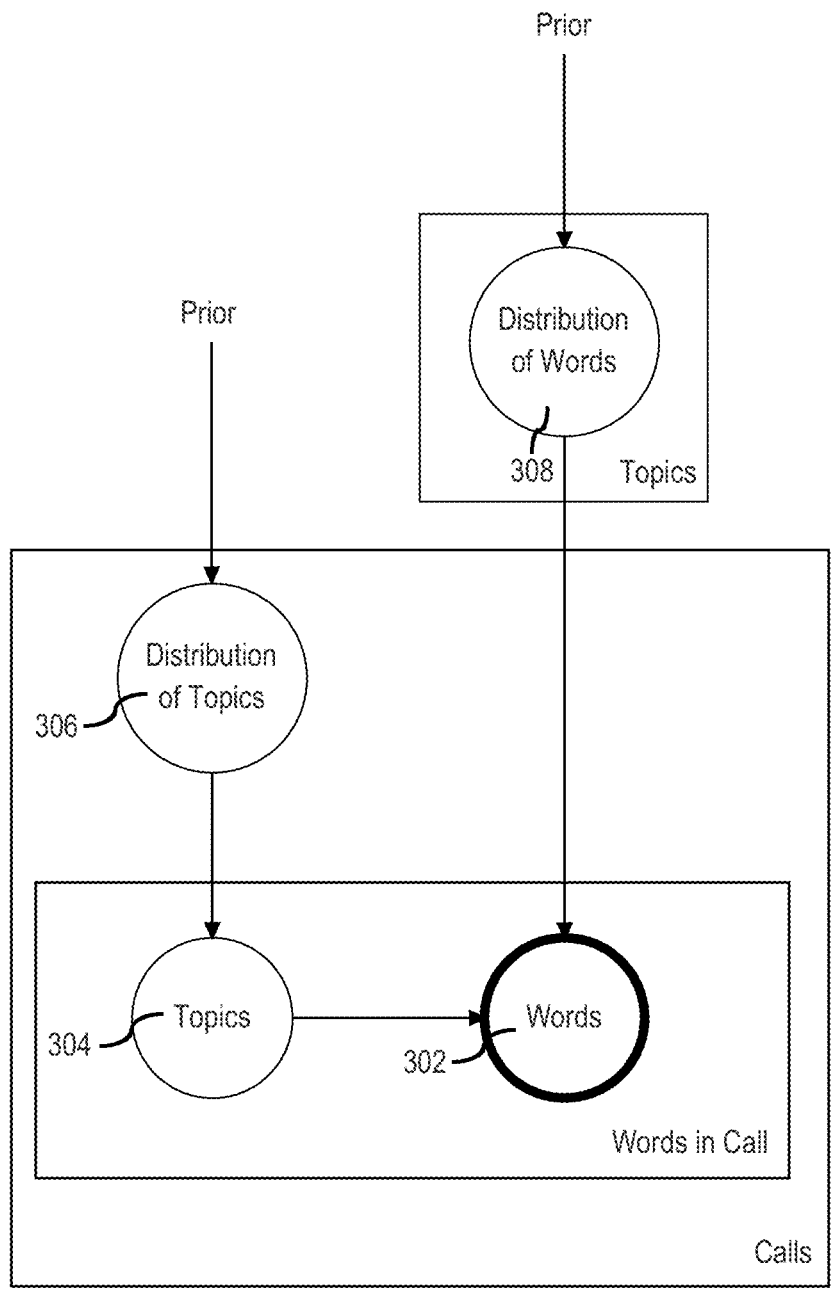
FIG. 3 depicts an example of a latent Dirichlet allocation (LDA) topic model.

FIG. 3 depicts an example of a latent Dirichlet allocation (LDA) topic model. In the models depicted in FIG. 3-5, the bolded circles represent data while the remaining circles represent probability distributions over the elements below them. The squares represent repetition of the model across an attribute, such as words in the call or all topics. The lines represent the modeling of one set of data as a draw from the above distribution of data. Finally, the bolded circle represents known input data, such as the words spoken in a call.

In the LDA topic model, each word of words 302 is modeled as a sample from the topics 304 which represent one or more topics spoken on the call. Topics 304 represent one of several variables being calculated through the topic model. Each word of words 302 is thus modeled as a probability of that word occurring given a topic of topics 304 being spoken in the call and a probability of that topic occurring on the call. As denoted by the box around these two circles, this modeling is repeated for all words in the call.

On the topic side of the model, the topics 304 are modeled as being drawn from a distribution of topics 306 for each call. In the LDA model, topics 304 are modeled from the distribution of topics 306 using a categorical model, such as a generalized Bernoulli distribution. Thus, in each call, there is assumed to be a probability distribution of topics 304 for each word of words 302. The probability distribution of topics 304 is assumed to be drawn from an overall call distribution of topics 306 Each word of words 302 is thus modeled as being drawn from that word's probability distribution of topics 304. This portion of the model is repeated across all calls which are used as input data into the model. The distribution of topics is modeled as being drawn from a prior distribution. In the LDA model, the prior distribution is a uniform prior distribution.

On the word side of the model, the words 302 are modeled as being drawn from a distribution of words 308 for each topic. In the LDA model, words 302 are modeled from the distribution of words 308 using a categorical distribution. The distribution of words 308 is replicated over topics, indicating that there exists a distribution of words for each of distinct topic of topics 304. Thus, words 302 are modeled as being drawn from a distribution of words 308 given one or more topics. The distribution of words is also modeled as being drawn from a prior distribution. In the LDA model, the prior distribution is a uniform prior distribution.

The LDA model is trained using input data from previous conversations. The input data comprises data from a plurality of previous calls. The data for each call comprises the words spoken on the call and identified topics for the call. Using the input data, the parameters for the different distributions can be calculated. A generative process is then run to determine model the topics 304 as a function of the words 302 spoken on the call. This can be done through Bayesian updating, such as by using Gibbs sampling, or through any other type of Monte Carlo simulation.

When a new dataset is received, the new dataset comprising a transcription of a call, the server computer 110 uses the model to compute one or more of a set of topics spoken on the call, a probability of each of the set of topics spoken on the call, a topic for each word spoken on the call, and/or a probability of each of the topic for each word spoken on the call.

4.2 Improved Topic Model for Calls

Figure 4:
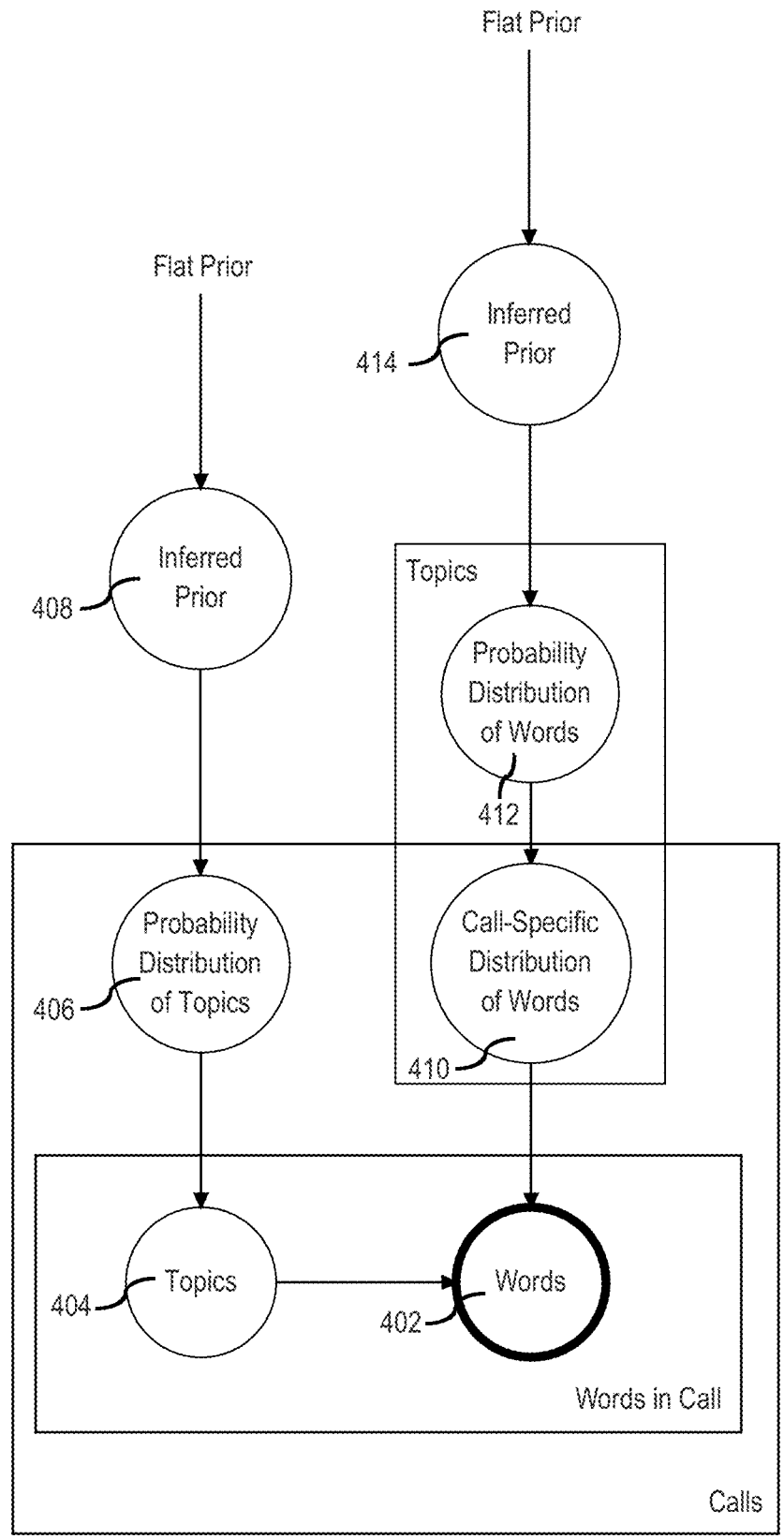
FIG. 4 depicts an example of an improved topic model which captures the non-uniformity in probabilities of certain topics discussed.

FIG. 4 depicts an example of an improved topic model which captures the non-uniformity in probabilities of certain topics discussed. The LDA model assumes that each topic has an equal probability of being pulled from the prior distribution. In actuality, certain topics are more likely to occur. For example, repair calls may be more common than sales calls for a car dealership as a sale only occurs once per lifecycle of a car while repairs may be performed multiple times during the lifecycle of a car.

In the improved model of FIG. 4, each of words 402 is modeled as a sample from per-word topic distributions 404. Similar to the LDA model, the topics in each call are modeled as being pulled from a distribution of topics 406. This process is repeated across all calls. Up to this point, the model has been similar to the LDA model. An improvement to the model of FIG. 4 is that while the LDA model models the distribution of topics as a sample from a Dirichlet distribution with a uniform prior, the model of FIG. 4 infers the prior distribution 408 which itself is modeled as a draw from a distribution with a uniform prior. In an embodiment, the model of FIG. 4 is further improved by using a Pitman-Yor process to model probabilities over each of the distributions. As the Pitman-Yor process is more flexible and better suited to language than the Dirichlet distribution used for the LDA model, the model's performance is improved through the use of the Pitman-Yor process. For instance, the Pitman-Yor process can model power-law distributions which better match distributions of words in language, thus providing more accurate and more efficient models.

An example method of modeling topics 404 as being drawn from a distribution of topics 406 which is drawn from an inferred prior distribution 408 draft from a flat prior distribution is described herein. Assuming topics (z) in a call are drawn from distribution of topics (θ) over a plurality of calls which are drawn from prior distribution (α) which is drawn from a flat prior distribution ($\alpha_0$), a probability of a particular topic being drawn may be computed as P (α, θ, z|$\alpha_0$) where only $\alpha_0$ is a known variable. Given that the distributions α and θ are unknown, the distributions are described in terms of customer counts c, representing tallies of data within the distribution, which are partitioned into a set of latent counts called table counts t which represent the fraction of the customer counts which get passed up the hierarchy to inform the parent distribution, i.e. the number of customer counts that show up in the parent node or $c_k^\alpha \equiv t_k^\theta$. Using customer and table counts, the probability of a topic may be computed as:

$$P(c^\theta, t^\theta, c^\alpha, t^\alpha, z|\alpha_0) = \left[\prod_J \left[\frac{(b^\theta|a^\theta)_{T_j^\theta}}{(b^\theta)_{c_j^\theta}} \prod_K \frac{S_{t_{j,k}^\theta}^{c_{j,k}^\theta}}{H_{t_{j,k}^\theta}^{c_{j,k}^\theta}}\right]\right] \left[\frac{(b^\alpha|a^\alpha)_{T^\alpha}}{(b^\alpha)_{c^\alpha}} \prod_K \frac{S_{t_k^\alpha}^{c_k^\alpha}}{H_{t_k^\alpha}^{c_k^\alpha}}\right] \left[\prod_K \alpha_{0_k}^{c_{0_k}}\right]$$

where the distribution of topics has dimension K and size J. The term S is an unsigned Stirling number of the first kind. The terms a and b are parameters of the Pitman-Yor process known as the discount and concentration, respectively. They may be considered fixed values or sampled using any known sampling technique. The function H is the choose function, also known as the binomial coefficient. The terms C and T are summations of the customer and table counts, respectively. Thus, $C \equiv \Sigma_k c_k$ and $T \equiv \Sigma_k t_k$. The terms $(b|a)_T$ and $(b)_c$ are Pochhammer symbols that have the identity of:

$(b|a)_T = b(b+a)(b+2a) \ldots (b+(T-1)a)$ $(b)_C = b(b+1)(b+2) \ldots (b+C-1)$.

As the customer counts in the above equation are a deterministic tally of data from x, the server computer may compute the probability above by sampling the table counts using a Gibbs sampler. Additionally or alternatively, a table indicator (u) may be defined as a Boolean variable indicating whether or not a data point created a new table count: $t_k = E_{n=1}^{c_k} u_{n,k}$. The server computer may sample the table indicators instead of the table counts to reduce the computational cost of sampling table counts. Bayes theorem may then be used to compute the probability of a given data point using the above equations and table counts sampled from the Gibbs sampler. For example, the server computer may compute the probability of a particular data point being absent and divide the probability above by the probability of the absent data point to compute the joint probability for the latent variables associated with the data point. Samples can be drawn from the resulting equation and latent variables may be stored for the data point. The server computer may then continue this process for each additional latent variable.

In the improved model of FIG. 4, a second improvement is displayed in the word side of the model. The LDA model assumes that each topic has a single distribution of words associated with it. While often true in text, language used in speech can vary from region to region or person to person based on differences in dialect and manner of discussing the same topic. Thus, the LDA model may identify a plurality of topics, one for each region or personal style of discussing a topic. In the improved model of FIG. 4, a call-specific distribution of words 410 is modeled as being pulled from a corpus-wide probability distribution of words 412 for each topic of a plurality of topics. Words 402 in each call are thus modeled as being drawn from call-specific distributions of words 410 replicated across a plurality of topics.

As a further improvement, as with the topic side of the model, the probability distribution of words 412 is modeled as being drawn from an inferred prior distribution 414 which is drawn from a flat prior distribution. This process may be modeled using a Dirichlet distribution or Pitman-Yor Process. An example method of modeling words 402 as being drawn from a call-specific probability distribution of words 410 which is drawn from probability distribution of word 412, drawn from an inferred prior distribution 414, drawn from a flat prior distribution is described herein. Assuming words (w) in a call are drawn from a call-specific probability distribution for the call (ψ) which are drawn from a probability distribution of words (ϕ) for each of a plurality of topics which is drawn from an inferred prior distribution (β) which is drawn from a prior distribution ($\beta_0$), a probability of a word being drawn from the model may be computed as:

$$P(w, \psi, \phi, \beta|\beta_0) = \left[\prod_V \beta_{0,v}^{c_v^{\beta_0}}\right] \left[f^\beta\right] \left[\prod_K f^{\phi_k}\right] \left[\prod_K \prod_D f^{\psi_{d,k}}\right]$$

where v ranges over the dimension of the node V which represents the size of the vocabulary of words, k ranges over the dimension of the node K which represents the number of topics on the topic side of the model, d ranges over the dimension of the node D which represents the number of calls, and where:

$$f^N \equiv \frac{(b^{(N)}|a^{(N)})_{T^{(N)}}}{(b^{(N)})_{c^{(N)}}} \prod_J \frac{S_{t_j^{(N)}}^{c_j^{(N)}}}{H_{t_j^{(N)}}^{c_j^{(N)}}}$$

Where j indexes over the dimension of the distribution (i.e., J=K on the topic side of the model, and J=V on the word side of the model).

Improvements on either side of the model described above may be utilized independent of each other by using the depicted equations along with the equations of the LDA model. Additionally or alternatively, the two probabilities may be combined to compute the probability P(z, θ, α, w, ψ, φ, β|β$_0$, α$_0$) in the improved model of FIG. 4 using the equation below:

$$P = \left[\prod_V \beta_{0,v}^{\beta_0}\right][f^\beta]\left[\prod_K f^{\phi_k}\right]\left[\prod_K \prod_D f^{\psi_{d,k}}\right] \times \left[\prod_K \alpha_{0,k}^{c_k^{\alpha_0}}\right][f^\alpha]\left[\prod_D f^{\theta_d}\right]$$

where the first part of the equation represents the word branch and the second part of the equation represents the topic branch.

As with the topic branch improvement described above, a Gibbs sampler may be defined which samples table counts from the dataset to compute a resulting probability from the above equation with Bayes theorem being used to compute the probability of a topic given the words spoken in a call. Since the $f^\mathcal{N}$ terms are the only ones with table counts, a term may be defined as:

$$R^{(\mathcal{N})} \equiv \frac{f^{(\mathcal{N})}}{f^{(\mathcal{N})}_{\neg d,n}}$$

where $f^{(\mathcal{N})}_{\neg d,n}$ is the state of the model with the word $w_{d,n}$ removed. The server computer may sample from the above equation and compute the product of $R^{(\mathcal{N})}$ across all nodes to produce the latent variables for each word $w_{d,n}$ in the dataset.

To obtain the state of the model with a word removed, the server computer 110 may sample P (z, θ, α, w, ψ, φ, β|β$_0$, α$_0$) as computed above. Table indicators for the model with the word removed may be sampled from the following equation:

$$u_{d,n} \sim \text{Bern}\left(\frac{t_{z_{d,n}}}{c_{z_{d,n}}}\right).$$

While sampling the state of the model with the word $w_{d,n}$ removed, the server computer may check the following constraints: t≤c and t=0 if an only if c=0. If either constraint is violated, the server computer may restore the state of the model and continue the process with the next word.

The improvements of the model of FIG. 4 allow the server computer to more accurately model topics from a conversation by taking into account variances in topic likelihoods and variances in the way different people discuss different topics. Thus, the server computer is able to more accurately determine topic models with less input information, thereby decreasing the computational cost of providing accurate topic categorizations of phone calls. Additionally, the higher accuracy of the topic model of FIG. 4 decreases the need for post-processing steps to clean or otherwise alter results of the topic model, thereby reducing resources used in computing topics for individual conversations.

4.3 Improved Topic Model with Party Segregation

Figure 5:
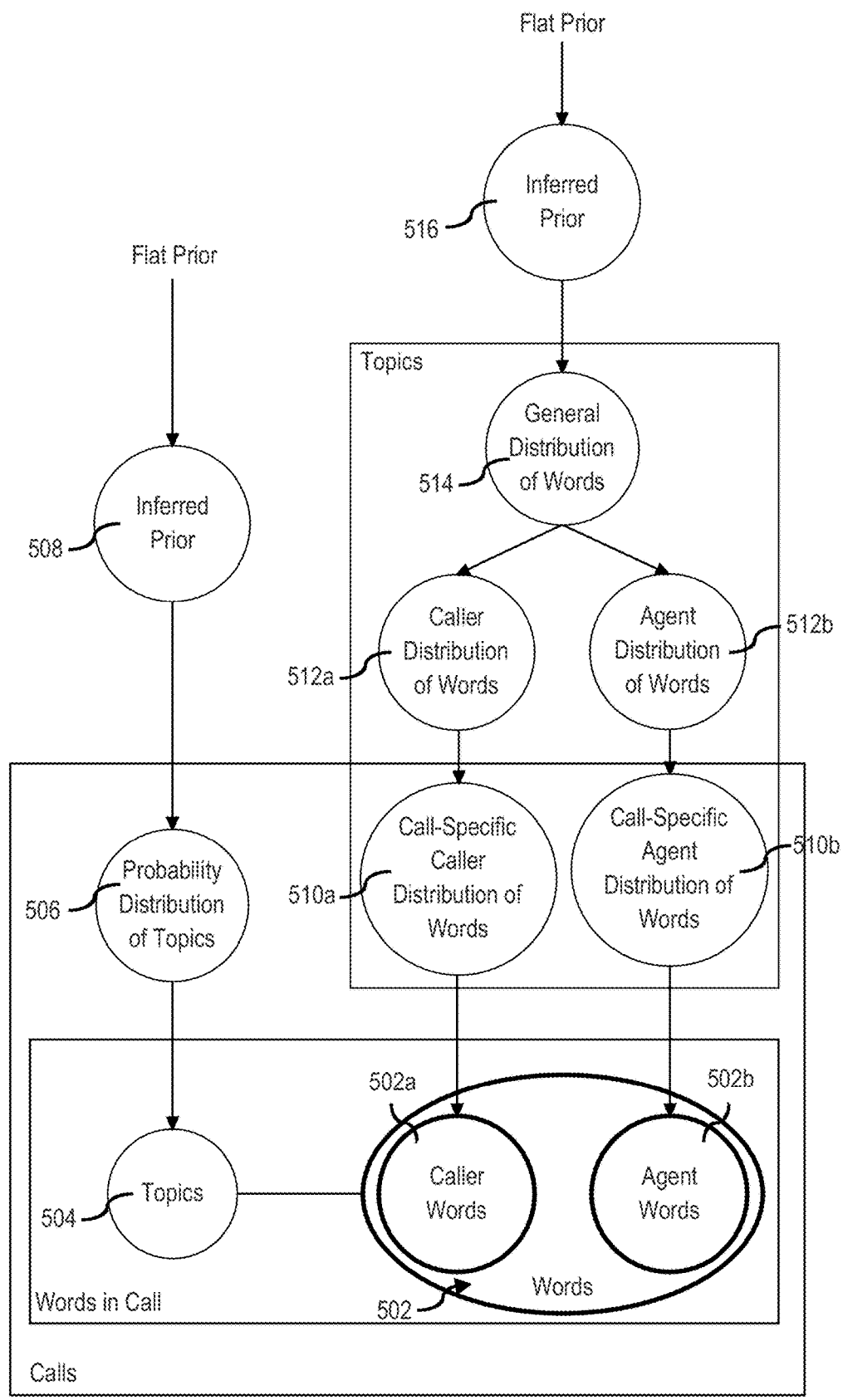
FIG. 5 depicts an example of an improved topic model which segregates parties of the conversation.

FIG. 5 depicts an example of an improved topic model which segregates parties of the conversation. The LDA model and the model of FIG. 4 both treat all words in a phone conversation as coming from a singular source when sampling from distributions of words. Thus, agent dialogue, which is often scripted or based on specific language provided to the agent for use in different calls, is mixed with the customer's language, which often varies across individuals. The differences in how customers speak and how agents speak are not captured by the model which treats all words as coming from the same source.

The topic side of the model of FIG. 5 is similar to the topic side of the model of FIG. 4. Topics 504 for words in a call are modeled as being drawn from a distribution of topics 506 in each call which is modeled as being drawn from an inferred prior distribution 508 which is drawn from a flat prior distribution. This process may be modeled using a Dirichlet distribution or Pitman-Yor Process.

On the word side of the model, prior to training the model the server computer may split words 502 into two sets of words, first person type words and second person type words. The first person type and second person type refer to types of people for a specific implementation of the model. For example, some businesses may split the calls into caller words 502a and agent words 502b. The model does not depend on the types of people being callers and agents and other implementations may be executed with the model of FIG. 5 provided that the calls comprise at least two topics of people. For example, campaigning calls may be split between campaign representative and voters.

While the model is described below with respect to person type distinctions, the segregation techniques described herein may segregate words in the model using any type of metadata. For example, instead of caller-specific and agent-specific distributions of words, there may be seasonal distributions of words, regional distributions of words, or any combination of segregated distributions. As is described below, a benefit of the topic model of FIG. 5 is its scalability to multiple topic segregations. Thus, there could be a distribution of words for each combination of caller/agent and season. This also allows for customization of a topic model to a specific type of business. For example, a topic model can be customized for a car dealership with a sale-time distribution, a new car release time distribution, and a distribution for non-sale and non-release times.

Each of the segregated sets of words are modeled simultaneously on person type-specific distributions. Thus, caller words 402a are modeled as being drawn from a call-specific caller distribution of words 510a which is modeled as being drawn from a caller distribution of words 512a which is drawn from an overall distribution of words for the topic. Similarly, agent words are modeled as being drawn from call-specific agent distribution of words 510b which is drawn from an agent distribution of words for the topic 512b, which is drawn from the general distribution of words 514 for each topic. Thus, while the caller words and agent words are separately modeled based on caller-specific and agent-specific distributions of words, both sets of distributions are modeled as being drawn from a general distribution of words 514 which is modeled as being drawn from an inferred prior distribution 516 which is modeled as being drawn from a flat prior distribution.

An example method of modeling words 502 by simultaneously modeling first person type data as a function of a first probability distribution of words used by the first person type for and the second person type data as a function of a second probability distribution of words used by the second person type, where both probability distributions are modeled as a function of a third probability distribution of words for one or more topics is described herein. As an example, the server computer may compute the probability P(z, θ, α, w, ψ, φ, η, β|β₀, α₀) for a plurality of speakers, S, using the equation below:

$$P = \left[\prod_V \beta_{0,v}^{c_v^{\beta_0}}\right][f^\beta]\left[\prod_k f^{\eta_k}\right]\left[\prod_S \prod_K f^{\phi_{k,s}}\right]\left[\prod_S \prod_K \prod_D f^{\psi_{d,k,s}}\right] \times$$

$$\left[\prod_K \alpha_{0,k}^{c_k^{\alpha_0}}\right][f^\alpha]\left[\prod_D f^{\theta_d}\right]$$

where the distribution η is the general distribution of words and φ_s is a distribution of words for an individual party to the call. Given that the addition of parties adds to the product of the terms with the s subscript, the model described above can be extrapolated to include any number of parties. As described above, sampling for the models described herein comprises sampling table counts for each node. Given that $c_k^\mu \equiv t_k^\nu$, table counts are used to inform the customer counts of the parent nodes. When a node has more than one child node, such as the general distribution of words 514, the table counts are summed across all children nodes. In order to increase the computational efficiency of summing the table counts, a hierarchical structure is defined where related sets of distributions are grouped together into nodes and related sets of nodes are grouped into layers. Where a parent node is drawing from a child node of the same size, each draw from a probability distribution of the child node may be passed to a corresponding distribution of the parent. Where a parent node with a single distribution draws from a child node with multiple distributions, the number table counts are summed across all children. If a number of distributions in a child node does not match a number of distributions in a parent node, the parent nodes may sum over a random or pseudo-random variable number of distributions in the child node while tracking which children nodes to sum over.

4.4 Topic Model Generator

In an embodiment, the server computer provides a topic model generator to the client computing device. The topic model generator, as used herein, refers to providing options for specifying nodes in a topic model which is then computed by the server computer. The topic model generator may comprise a graphical user interface with options for selecting and adding nodes to a graph and/or a text file with a designated structure such that adding nodes to the graph comprises editing data in the text file to identify nodes to be added to the graph in different locations.

Figure 6:
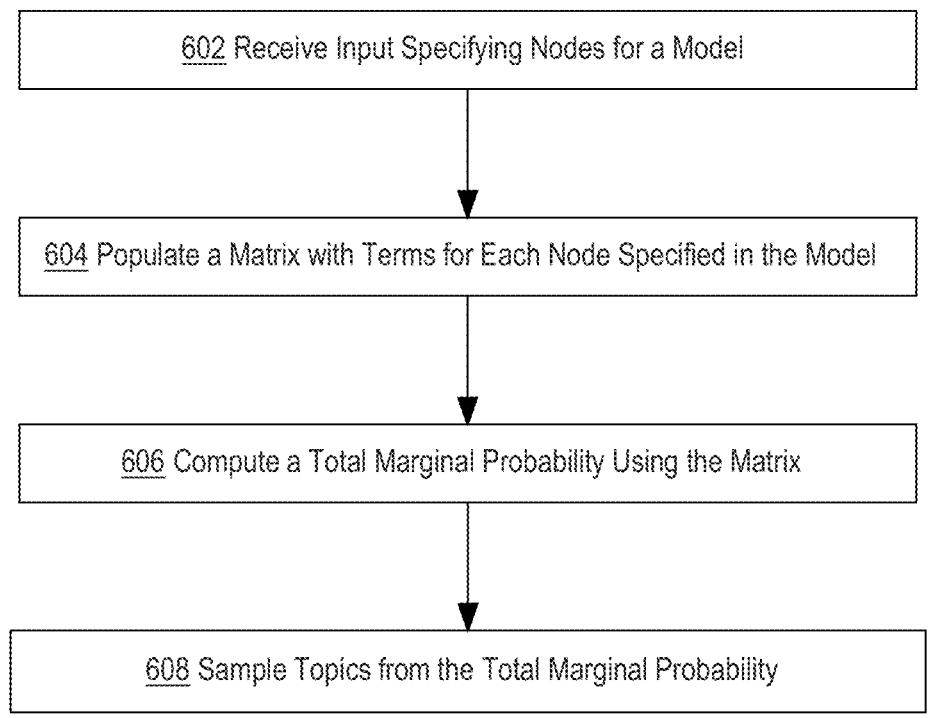
FIG. 6 depicts an example an example method for dynamically building a model based on user input.

FIG. 6 depicts an example method for dynamically building a model based on user input. At step 602, input is received specifying nodes for a model. For example, the server computer may receive a request to build a topic model with a plurality of nodes. The request may include call transcripts to be categorized through the topic model and/or specify a set of stored call transcripts to be categorized through the topic model. The input may specify nodes for both the topic side of the model and the word side of the model. The input may be received through a graphical user interface or through a text file specifying the building of a model based on particular nodes.

At step 604, the server computer populates a matrix with terms for each node specified in the model. For example, a matrix may be defined with terms that rely on the table counts, using the variable $R^{(\mathcal{N})}$ as defined above. The columns of the matrix may correspond to topics (k), while the rows correspond to the nodes specified by the user input. The first row of the matrix may refer to the lowest child node aside from the final word or topic node. Thus, the first row is populated with terms for when u=0 on the lowest child node aside from the final word or topic node. The next row corresponds to the next lowest child node. Thus, u=0 for the next lowest child node and u=1 for the lowest child node. An $R^{(\mathcal{N})}$ is only added to the matrix for a parent node when u=1 for its child node. While computing the probability over all states of the model could cause the sampling task to become exponentially more computationally complex for each node added to the model, the server computer may restrict analysis to only possible states of the model. The server computer may store the possible states in a two-dimensional matrix which is then used to compute the values in the matrix described above.

As an example, a matrix for both the topic branch ($p^{topic}$) and the word branch ($p^{word}$) described in FIG. 4 may be computed as:

$$p^{topic} \equiv \begin{bmatrix} R^\theta_{k=0,u=0} & R^\theta_{k=1,u=0} & \cdots \\ R^\theta_{k=0,u=1}R^\alpha_{k=0,u=0} & R^\theta_{k=1,u=1}R^\alpha_{k=1,u=0} & \cdots \\ R^\theta_{k=0,u=1}R^\alpha_{k=0,u=1}R^{\alpha_0}_{k=0,u=0} & R^\theta_{k=1,u=1}R^\alpha_{k=1,u=1}R^{\alpha_0}_{k=1,u=0} & \cdots \end{bmatrix}$$

$$p^{word} \equiv$$

$$\begin{bmatrix} R^\psi_{k=0,u=0} & R^\psi_{k=1,u=0} & \cdots \\ R^\psi_{k=0,u=1}R^\phi_{k=0,u=0} & R^\psi_{k=1,u=1}R^\phi_{k=1,u=0} & \cdots \\ R^\psi_{k=0,u=1}R^\phi_{k=0,u=1}R^\beta_{k=0,u=0} & R^\psi_{k=1,u=1}R^\phi_{k=1,u=1}R^\beta_{k=1,u=0} & \cdots \\ R^\psi_{k=0,u=1}R^\phi_{k=0,u=1}R^\beta_{k=0,u=1}R^{\beta_0}_{k=0,u=0} & R^\psi_{k=1,u=1}R^\phi_{k=1,u=1}R^\beta_{k=1,u=1}R^{\beta_0}_{k=1,u=0} & \cdots \end{bmatrix}$$

where each column corresponds to an increasing value of k and each row includes an additional $R^{(\mathcal{N})}$ term for a parent of the last node in the previous row. Each position in the matrix thus represents a state for that branch of the model with its value representing the probability for the branch to take on that state. Thus, the server computer 110 can build matrices with any number of nodes by adding rows for each requested node.

The matrix may be initiated based on the user input. First, a matrix may be generated with a number of rows equal to the number of nodes specified in the user input. Thus, if the user input specifies three nodes to be added to the final topic node, the server computer may generate a matrix with three rows. All elements in the matrix may be initialized to 1. Then, for $\ell \in [1, \text{depth}-1]$, the server computer may compute the vectors $R^\ell_{k,u=0}$ and $R^\ell_{k,u=1}$, compute the product of $P_{l,k}$ and $R^\ell_{k,u=0}$, and, for $m \in [l+1, \text{depth}]$, multiply $P_{m,k}$ and $R^\ell_{k,u=1}$. The server computer may then compute $R_{k,u=0}$ for the base node and compute the product of $P_{depth,k}$ by $R_{k,u=0}$.

At step 606, a total marginal probability is computed using the matrix. For example, the server computer may initially compute the partial marginal probabilities by summing each matrix along its depth axis. The total marginal probability may then be computed by multiplying the partial marginal probabilities elementwise.

At step 608, topics are sampled from the total marginal probability. For example, the server computer may evaluate the matrices defined in step 604 for each word within each dataset. The server computer may continue evaluating the matrix with different words until convergence is reached. The server computer may then use the matrices to compute the total marginal probabilities for each of a plurality of topics for each of the words in a dataset.

Using the method of FIG. 6, the server computer can generate a model on demand with nodes specified by a client computing device. By automatically generating and training a model based on user input, the server computer provides configurable models without requiring in-depth knowledge or expertise in generating conversation models.

5.0 Topic Display

In an embodiment, the server computer provides topic information to the client computing device. The topic information may indicate, for each of a plurality of topics, a number or percentage of calls received for that topic over a particular period of time. For example, the server computer may send identify calls received for different topics on an hourly, daily, weekly, or monthly basis. The server computer may additionally provide options to customize the topic information. For example, the server computer may provide an interface where a client computing device specifies a start time/date and an end time/date. The server computer may provide the topic information for the specified period of time by identifying each call received during that period of time and incrementing a topic counter for each topic when a call was identified as corresponding to the topic.

The server computer may provide graphs that depict the topic information to the client computing device. For example, the server computer may generate a histogram with the x-axis corresponding to time intervals, such as hours, days, or weeks, and the y-axis corresponding to a number or percentage of calls that were received for a topic. Separate histograms may be provided for each topic and/or a joint histogram may be generated which includes a plurality of bars for each time interval, each of the plurality of bars corresponding to a different topic of a plurality of topics.

In an embodiment, the server computer further identifies the words that correspond to each of the topics, such as by computing the probabilities for words individually and identifying corresponding probabilities for different topics. As the topics may not be named in advance, specifying the words with the highest probabilities of being associated with a topic allow for easier identification of the topic. If the server computer receives input naming a particular topic, the server computer may update stored data to include the name of that topic for other data sent to the client computing device.

The server computer may use the identified words for each of the topics to generate a word bubble display for the client computing device. The word bubble display may include a plurality of bubbles, each corresponding to a different topic. The size of the bubble may correspond to the frequency with which the topic is discussed, with larger bubbles corresponding to topics that are discussed more frequently and smaller bubbles corresponding to topics that are discussed less frequently. The bubbles may include words inside them that correspond to the topic of the bubble. For example, a bubble for the topic of purchasing a vehicle may include the words "car", "price", "financing", and "credit".

The server computer may provide a graphical user interface to the client computing device with the topic information. The graphical user interface may provide charts and graphs for different and/or customizable time periods corresponding to call data provided by the client computing device. The graphical user interface may comprise insights to the call data, such as origins and destinations of the calls within different topics retrieved from metadata. The graphical user interface may additionally provide options to rename topics and/or merge topics.

In an embodiment, the topic information is provided to a real-time bidding platform where users bid on calls based on keywords of the call or other information. The topic information may additionally be used to intelligently route calls from a source to a destination.

6.0 Broad and Scripted Topic Identification

Figure 7:
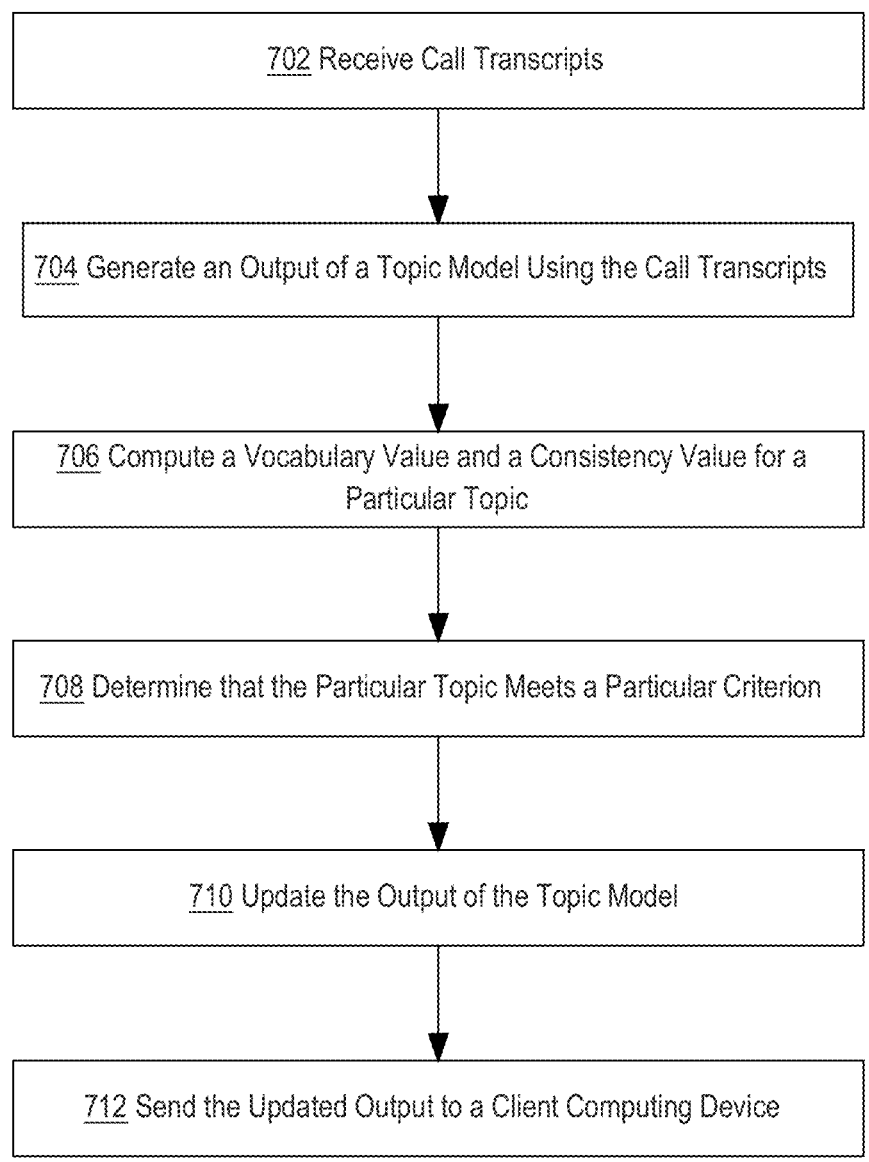
FIG. 7 depicts an example method for updating an output of the topic model based on one or more criteria.

FIG. 7 depicts an example method for updating an output of the topic model based on one or more criteria.

At step 702, call transcripts are received. The call transcripts may comprise electronic digital representations of verbal transcriptions of a call. For example, the call transcripts may include transcribed dialogue from a voice communication using telephone, voice over IP, or other telecommunications technology. The transcribed dialogue may uniquely identify the different parties to the conversation. In an embodiment, the different parties are identified as a person type, such as agent and customer. Personally identifiable information such as real names is not required and the identification values can be generic or specify roles. Tags may be placed in the transcriptions of the call which identify, for a block of dialogue, the party or party type which spoke the block of dialogue in the call. The call transcripts may additionally comprise metadata, such as timestamps for one or more blocks of text, total call length, or other call information. Receiving the call transcripts may comprise receiving the call transcripts from an external computing device and/or generating call transcripts from an audio file received from an external computing device and receiving the call transcripts from memory of the server computer.

At step 704, an output of a topic model is generated using the call transcripts. The output of the topic model may identify a plurality of topics discussed during calls corresponding to the call transcripts. For example, the call transcripts may be processed using one of the topic models described herein. The topic models described herein generate probability distributions for each of a plurality of topics, the topic distributions including, for each topic, a plurality of words with corresponding probabilities of the word being spoken given the topic. The distributions are then used to determine topics spoken on the call based on likelihoods of the words that were spoken on the call having been spoken given one or more topics. Thus, the output of the topic model may comprise one or more topics of the plurality of topics with corresponding words from one or more call transcripts that correspond to the one or more topics.

At step 706, a vocabulary value and a consistency value are computed for a particular topic. The vocabulary value may represent a vocabulary of the particular topic while the consistency value represents a consistency of the topic across two or more transcripts. The vocabulary value and consistency value may be computed for each of a plurality of topics. The server computer 110 may use the values to determine whether topics meet one or more criteria and therefore should be distinguished or removed. For instance, scripted or broad topics may be identified using one or more of the vocabulary value or the consistency value.

The vocabulary vowel generally represents a number of words within a probability distribution. The vocabulary of a distribution for a particular topic may be computed from the entropy of the distribution. In an embodiment, the vocabulary (N) of a distribution for a particular topic (k) is computed as follows:

$$N_k = e^{H_k}$$

where $H_k$ is the entropy of the distribution computed as:

$$H_k = \sum_v -p_{kv} \ln(p_{kv})$$

where $p_{kv}$ is the probability of word v given topic k as computed from the topic distribution. The vocabulary value may be computed from the topic distribution across all calls. Thus, for topic models described herein where the words on the call are modeled as a function of per-call topic distributions which are modeled as a function of a total topic distribution, the vocabulary may be computed as a function of the probability of the words from the total topic distribution. In embodiments where the topic is segregated as described in Section 4.3, the vocabulary value may be an average of the vocabulary values for each distribution, a selected lowest vocabulary value from the distributions, a selected highest vocabulary value from the distributions, and/or any other means of selecting and/or combining the values from the segregated topic distributions. Additionally or alternatively, the vocabulary value may be computed using the overall topic distribution from which the segregated distributions are drawn.

The consistency value generally represents the consistency of the topic across multiple call transcripts, such as a variability in words used from the topic from call to call. In an embodiment, the consistency value is a burst concentration value or is computed from a burst concentration value. The burst concentration value may comprise a parameter of the probability distributions described above. For example, the probability distributions described above are proportional to:

$$P \propto \prod_K \left[ \prod_D \frac{(b_k^\psi | a^\psi)_{T_{dk}^\psi}}{(b_k^\psi)_{C_{dk}^\psi}} \right]$$

where $b_k^\psi$ is the burst concentration value for topic k across distribution $\psi$, $T_{dk}^\psi$ is the sum of the table counts for word d in topic k across distribution $\psi$, and $C_{dk}^\psi$ is the sum of the table counts for word d in topic k across distribution $\psi$. The above equation can be simplified in terms of the Gamma function as follows:

$$P \propto \prod_K \left[ \prod_D \frac{\Gamma(b_k^\psi)}{\Gamma(b_k^\psi + C_{dk}^\psi)} \prod_{i=1}^{T_{dk}^\psi - 1} (b_k^\psi + ia^\psi) \right]$$

As the above equation evaluates the probability as a function of the burst concentration, the above equation can be solved for the burst concentration using hill climbing, Metropolis-Hastings, slice sampling, adaptive rejection sampling, and/or any other mathematical algorithm.

In an embodiment, additional variables are introduced to allow the server computer 110 to compute the burst concentration in a manner that is more computationally efficient and less computationally expensive. For instance, solving the above equation includes a full loop over the dataset and many of the aforementioned algorithms require solving the above equation multiple times. As the dataset gets larger, the computational complexity of solving for the burst concentration becomes much larger.

In order to simplify the above equation, two new variables, $q_{dk}$ and $\zeta_{dki}$ may be introduced which are dependent on Beta and Bernoulli distributions. The variable dependent on the Beta distribution may be computed as:

$$q_{dk} \sim \text{Beta}(b_k^\psi, C_{dk}^\psi)$$

and the variable dependent on the Bernoulli distribution may be computed as:

$$\zeta_{dki} \sim \text{Bern}\left( \frac{b_k^\psi}{b_k^\psi + ia^\psi} \right)$$

Using the new variables described above, the burst concentration may be computed using the following equation:

$$b_k^\psi \sim \text{Gamma}(\gamma_0^\psi + \tau_{0k}, \gamma_1^\psi + \tau_{1k})$$

where the shape parameters $\tau_{0k}$ are defined as:

$$\tau_{0k} = \sum_D \sum_I \zeta_{dki}$$

rate parameters $\tau_{1k}$ are defined as:

$$\tau_{1k} = \sum_D -\ln q_{dk}$$

and the concentration parameters $\gamma_0^\psi$ and $\gamma_1^\psi$ are defined as:

$$P(b_k^\psi) = (\gamma_0^\psi, \gamma_1^\psi)$$

By computing the burst concentration as a function of the newly introduced variables that are dependent on the Beta and Bernoulli distributions, the computation of the burst concentration is performed in a much more computationally efficient manner, thereby improving the functioning of the computer system of FIG. 1 when evaluating criteria that include the burst concentration.

At step 708, the server computer 110 determines that the particular topic meets a particular criterion. The particular criterion may be one or more criteria that are related to the consistency value and/or the vocabulary value. In FIG. 7, the particular criterion is a criterion which is used to determine whether the particular topic should be removed or distinguished. As an example, the particular criterion may be used to identify and remove scripted topics. While FIG. 7 focuses on topics that are removed or distinguished, the criterion may be described herein as identifying topics to keep, such as identifying conversational topics. The two may be described interchangeably herein, as determining whether to keep a topic inherently includes determining whether to remove the topic and vice versa. Thus, criteria may be described as criteria for keeping a topic as opposed to criteria for removing a topic.

In an embodiment, the criteria may be based on threshold values for the burst consistency value or the vocabulary value. For example, a topic may be determined to be a "conversational" topic if the vocabulary value is greater than a first threshold value, such as 100, and the burst concentration is less than a second threshold value, such as 175.

Thus, topics with a vocabulary less than the first threshold value or with a burst concentration greater than the second threshold value may be identified as topics to be removed. For instance, a conversation with a low vocabulary that is highly consistent across calls may be identified as a recording or otherwise scripted topic.

In an embodiment, the server computer 110 further computes a distance value which is used to determine whether the particular topic meets the one or more criteria. The distance value generally represents a difference in probability distributions for a topic amongst parties to the call. For example, a topic model may segregate words in each call based on a party type, such as in the model of Section 4.3. The distance value may generally represent a difference between a probability distribution for a first party type, such as the caller distribution of words 512a of FIG. 5, and a probability distribution for a second party type, such as the agent distribution of words 512b.

The distance value may be computed using any of a plurality of techniques. For example, a distance value may be computed as:

$$D(\text{topic}_k, \text{topic}_j) = \sum_v p_{kv} \log\left(\frac{p_{kv}}{p_{jv}}\right)$$

where $p_{kv}$ and $p_{jv}$ are the probabilities of word v occurring given a particular topic in party-specific distributions k and j respectfully. For example, $p_{kv}$ may be the probability of a particular word appearing in the agent distribution of words for a particular topic while $p_{jv}$ is the probability of the particular word appearing the caller distribution of words for the particular topic. As another example, a distance value may be computed as follows:

$$D(\text{topic}_k, \text{topic}_j) = \frac{1}{\sqrt{2}}\left[\sum_v (\sqrt{p_{kv}} - \sqrt{p_{jv}})^2\right]^{1/2}$$

In an embodiment, the distance value is used to determine whether the particular topic meets the particular criterion. For example, topics with a distance value greater than a threshold value, such as 0.5, may be identified as scripted topics.

Different criteria may be used for identifying different thresholds. For example, a topic may be identified as a scripted topic if the distance value is greater than a first threshold value, while a topic may be identified as broad if the distance value is not greater than the first threshold value but the effective vocabulary size is greater than a second threshold value. Conversational topics may be identified as topics that do not meet the above criteria, i.e. the distance value is not greater than the first threshold and the effective vocabulary size is not greater than the second threshold, and where the consistency value is less than a third threshold value. In an embodiment, any topic left after identifying the above topics may be flagged as a separate group of topics and/or grouped in with the scripted topics. For example, the topic may be identified as a performed script, such as when a party is following a script as opposed to a recording which may have less variation.

Figure 8:
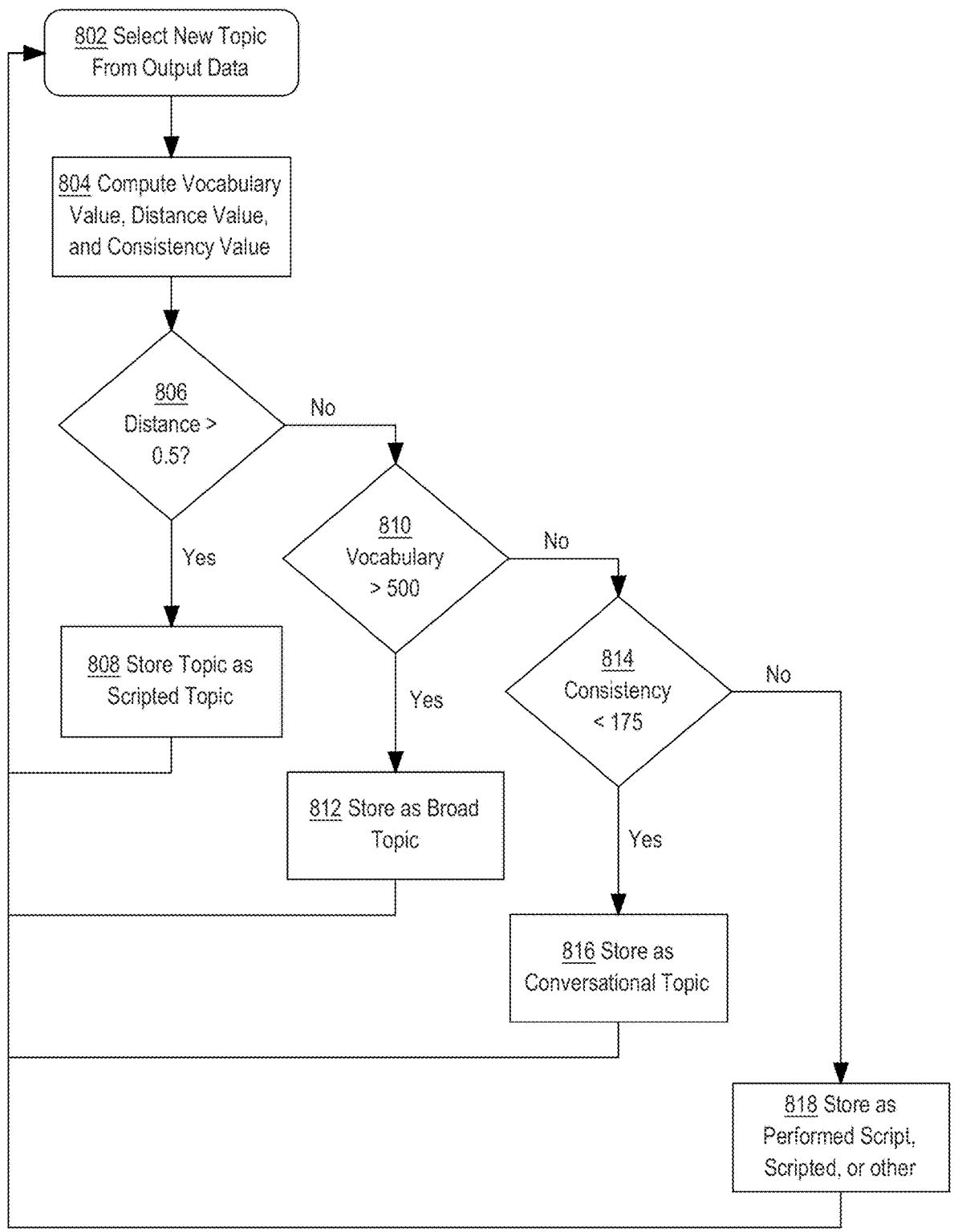
FIG. 8 depicts an example method for classifying topics.

FIG. 8 depicts an example method for classifying topics. The threshold values of FIG. 8 are provided for the purpose of providing a clear example and embodiments may use other threshold values for steps 806, 810, and 814. At step 802, a new topic is selected from output data of a topic model being run with a plurality of call transcripts. At step 804, a vocabulary value, distance value, and consistency value are computed for the selected topic, such as by using any of the methods described above. The values may additionally be transformed versions of the values that are compared to different threshold values. For example, the vocabulary value may comprise a base ten logarithm of the entropy as described above.

At step 806, the server computer 110 determines if the distance value is greater than 0.5. If the distance value is greater than 0.5, at step 808 the topic is stored as a scripted topic. For example, the server computer 110 may store data comprising an identifier of a topic and an indicator which indicates that the topic is a scripted topic. The system may then proceed to step 802 and select a new topic.

If the server computer 110 determines that the distance value is not greater than 0.5, at step 810 the system determines if the vocabulary value is greater than 500. If the vocabulary value is greater than 500, at step 812 the topic is stored as a broad topic. For example, the system may store data comprising an identifier of the topic and an indicator which indicates that the topic is a broad topic. The system may then proceed to step 802 and select a new topic.

If the server computer 110 determines that the vocabulary value is not greater than 500, at step 814 the system determines if the consistency value is less than 175. If the consistency value is less than 175, at step 816 the topic is stored as a conversational topic. For example, the system may store data comprising an identifier of the topic and an indicator which indicates that the topic is a conversational topic. Additionally or alternatively, the system may indicate that the topic is a conversational topic by not storing additional data for the topic, as the additional data may identify only topics to be removed or distinguished. If the system determines that the consistency value is not less than 175, at step 818, the system stores the topic as a performed script, a scripted topic, or as a separate category, such as topics which require manual attention. For example, the system may store data comprising an identifier of the topic and an indicator which indicates that the topic is a scripted topic, such as is identified in step 808, or a different category of topic, such as a topic that needs more review or a performed script. After steps 816 and 818, the system may proceed to step 802 and select a new topic.

The criteria above may be evaluated in any order using threshold values as described above. For example, the server computer 110 may first identify conversational topics as topics that meet the criteria above based on the three thresholds and then identify the broad and scripted topics. In an embodiment, determining that the particular topic meets the particular criterion comprises determining that the topic is not identified as a conversational topic and/or determining that the topic is identified as one of the topic types that is not the conversational topic.

At step 710, the output of the topic model is updated. For example, the scripted topics and/or broad topics may be removed or distinguished in the output data. Removing may comprise removing identifiers of the topic from output data. For example, the server computer 110 may generate output data for a plurality of call transcripts that identifies, for each call transcript, a plurality of topics discussed on the transcript with the topics being identified, at least in part, by words used in the topic. The system may remove identifiers of the scripted topics and/or broad topics from the output.

In an embodiment, removing the topic may comprise improving the topic model output by rerunning the topic model without the topic. For example, the server computer 110 may identify words in each of the transcript that correspond to the topic, such as by identifying words with the highest probability of being pulled from the topic and/or any other approach of matching the word to a single topic over others. The system may then generate new call transcripts without the identified words and/or remove the identified words from the existing transcripts, thereby creating updated call transcripts. The system may then rerun the topic model with the updated transcripts to generate an updated output of the topic model.

Distinguishing may comprise causing display of a visual indication that the topic is different from non-distinguished topics. For example, the server computer 110 may store data which identifies the topic as a topic to be distinguished. When the system causes display of the output of the topic model on the client computing device, the system may visually distinguish topics identified in the stored data, such as by displaying the topic with a different font, shading, color, or other feature, displaying a separate indicator, such as a bolded or outlined word identifying the topic as distinguished, and/or displaying the topic in a different location, such as a section for scripted or broad topic.

In an embodiment, the server computer 110 performs different actions depending on a criterion that was satisfied by the topic. For example, identifiers of the broad topic may be removed altogether while scripted topics may be distinguished by being identified as being scripted topic in the output data. Thus, the system may update the output data in different ways depending on a type of topic identification.

At step 712, the updated output is sent to a client computing device. Sending the updated output to the client computing device may include causing displaying, on the client computing device, a graphical user interface which includes identifiers of a plurality of topics. The displayed topics may exclude identifiers that corresponded to the topics that meet the one or more criterion and/or may visually distinguish said topics, such as through grouping them in a particular portion of the interface, adding a tag to them that indicates they are scripted or broad topics, and/or applying visual indicators such as underlines, highlights, font changes, or other indicators to distinguish said topics from a remainder of topics.

By updating the output data of the topic model, the systems and methods described herein provide a technical solution to a technical problem. Machine learning systems performing topic modeling, while useful in creating large amounts of topic data in an efficient manner, can create extraneous topic data or topic data for scripted messages. This extraneous topic data or scripted message data can increase the complexity of the output data, making display and searching of the data difficult if not intractable. Additionally, the existence of these topics in the call transcripts can negatively affect the topic model's abilities to correctly identify other topics, as scripted advertisements can make each and every call appear to include a discussion of every element discussed in the advertisement. Thus, identifying the scripted topics allows for their removal from the transcripts so that the model can be rerun to identify the topics within the calls more accurately.

7.0 Training Dataset Generation

Figure 9:
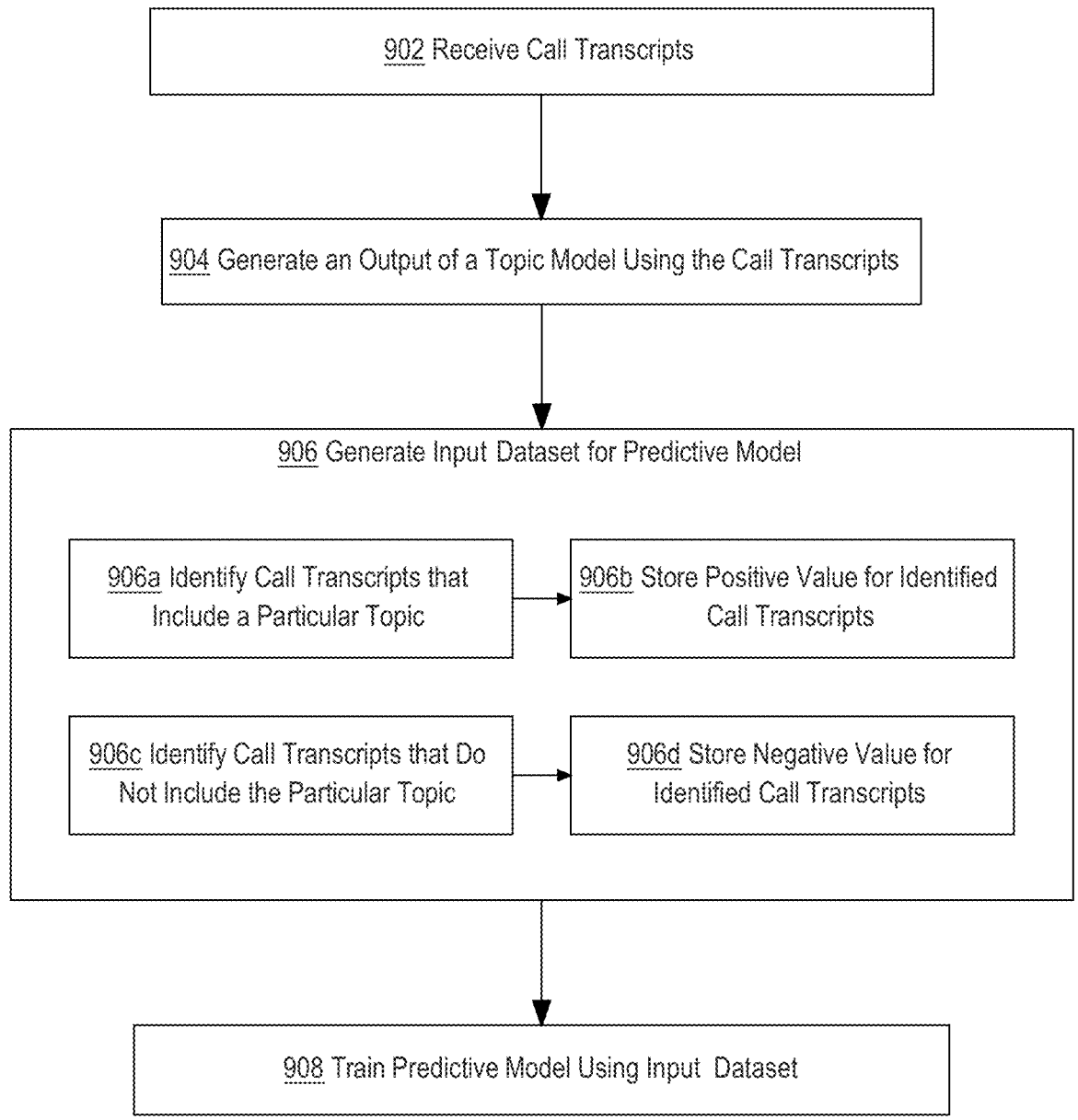
FIG. 9 depicts an example computer-implemented method for generating an input dataset for a supervised learning model from the output of a topic discovery model.

FIG. 9 depicts an example computer-implemented method for generating an input dataset for a supervised learning model from the output of a topic discovery model. The term "topic discovery model" may refer, for example, to the models described in Section 4 because they comprise unsupervised models which use call transcripts to group words from the calls into individual topics. While such models are useful for identifying the types and scope of topics discussed on a plurality of calls, the inventors have discovered that improvements are possible for identifying, from a plurality of call transcripts, which call transcripts included a specific topic.

At step 902, call transcripts are received. In an embodiment, call transcripts 112 (FIG. 1) are received and may comprise electronic digital representations of verbal transcriptions of a call. For example, the call transcripts may include transcribed dialogue from a voice communication using telephone, voice over IP, or other telecommunications technology. The transcribed dialogue may uniquely identify the different parties to the conversation. In an embodiment, the different parties are identified as a person type, such as agent and customer. Personally identifiable information such as real names is not required and the identification values can be generic or specify roles. Tags may be placed in the transcriptions of the call which identify, for a block of dialogue, the party or party type which spoke the block of dialogue in the call. The call transcripts may additionally comprise metadata, such as timestamps for one or more blocks of text, total call length, or other call information. Receiving the call transcripts may comprise receiving the call transcripts programmatically, by reading call transcripts files or receiving messages or links from an external computing device that identify the call transcripts, and/or generating call transcripts from an audio file received from an external computing device, receiving the call transcripts from memory of the server computer, retrieving call transcripts from a filesystem, database, or other data repository. All such call transcripts are digitally stored data.

At step 904, the process is programmed to generate an output of a topic model using the call transcripts. The output of the topic model may identify a plurality of topics that were discussed during calls represented in the call transcripts. For example, the call transcripts may be processed under stored program control using one of the topic models described herein. The topic models described herein generate probability distributions for each of a plurality of topics, the probability distributions including, for each topic, a plurality of words with corresponding probabilities of the word being spoken given the topic. The distributions are then used to determine the probability that each word on the call was sampled from each of the plurality of topic distributions. Thus, the output of the topic model may comprise one or more topics of the plurality of topics with corresponding words from one or more call transcripts that correspond to the one or more topics. The output may also include probabilities for each word on a call that the word is associated with one or more of the plurality of topics.

At step 906, an input training dataset is generated for a supervised learning model using the output of the topic model. For example, the server computer 110 may perform steps 906a-906d to generate a labeled input training dataset. The input training dataset comprises input data and output data for a supervised learning model. The input data may comprise call transcripts corresponding to individual telephone calls. Pre-processing steps may be performed with respect to the call transcripts to format the call transcripts so that they can be input into the supervised learning model. For example, the server computer 110 may generate a list of the words that appear in a call transcript. Other metadata may be associated with individual words of the list of words, such as a speaker of the words, a region in which the words were spoken, or any other metadata which is provided with the call transcripts. Metadata may also be associated with the call transcript, such as a time of day or duration of call.

The output data may be an indicator as to whether a particular topic was spoken during the call corresponding to the call transcript. For example, a "true" call transcript may comprise a call transcript which included a particular topic. To indicate that the call transcript is a "true" call transcript, the server computer 110 may store a "true" value in association with the call transcript and particular topic, such as a 1. In contrast, a "false" transcript may comprise a call transcript which did not include the particular topic. To indicate that the call transcript is a "false" transcript, the server computer 110 may store a "false" value in association with the call transcript and the particular topic, such as a 0.

At step 906a, call transcripts that include a particular topic are identified. The server computer 110 may identify call transcripts that include the call by programmatically comparing the proportion of words in the stored call transcript that exist in a particular topic with a threshold value. The proportion of words in the stored call transcript that exist in a particular topic may be computed as the prior probability $\theta_{d,k}$ that the words on a particular call (d) are assigned to a particular topic (k). The prior probability $\theta_{d,k,w}$ is computed as part of the computations in the topic discovery models of Section 4 and roughly represents the probability for a particular word in the particular call that the particular word was pulled from the particular topic. Thus, the prior probability for all of the words, $\theta_{d,k}$ comprises a smoothed estimate of the probabilities for each word $\theta_{d,k,w}$, made using the hierarchical model described in sections 4.2 and 4.3, where $\theta_{d,k,w} = \theta_{d,k} \psi_{k,w}$.

The threshold value may comprise a value that is a function of the call length ($N_d$) for the particular call, an average call length, and/or a value corresponding to an a priori expected proportion of words in the stored call transcript that are drawn from the particular topic. The a priori expected proportion of words in the stored call transcript, $\alpha_k$, comprises a corpus-wide average of the prior probability $\theta_{d,k}$ across all calls. Thus, the server computer 110 may determine whether the prior probability $\theta_{d,k}$ is greater than the a priori probability ($\alpha_k$) multiplied by a value corresponding to the call length ($N_d$). The value corresponding to the call length may comprise a value computed from the call length. The value corresponding to the call length may additionally use one or more other values, such as an average call length. As an example, the server computer 110 may evaluate the following expression:

$$\theta_{dk} \geq \alpha_k \left(\frac{\widetilde{N_d}}{N_d}\right)^{\frac{2}{3}}$$

where $\widetilde{N_d}$ is the average call length for the plurality of calls. While the value of $$\left(\frac{\widetilde{N_d}}{N_d}\right)^{\frac{2}{3}}$$

is used as the value corresponding to the call length, other embodiments may use different values that utilize call length.

If the prior probability $\theta_{dk}$ is greater than or equal to the threshold value, such as in the equation above, the server computer 110 may determine that the call transcript includes the particular topic. Additionally or alternatively, the server computer 110 may evaluate one or more other criteria to determine whether the call transcript includes the particular topic. For example, the server computer 110 may store a word number threshold for a number of words in the call transcript that correspond to the particular topic. If the number of words in the call transcript that correspond to the particular topic are greater than the word number threshold, the server computer 110 may determine that the call transcript includes the particular topic. In an embodiment, the server computer 110 only determines that the call transcript includes the particular topic if both aforementioned criteria are met, meaning that the prior probability is greater or equal to the threshold value and the number of words in the call transcript that correspond to the particular topic are greater than the word number threshold.

In an embodiment, the server computer 110 determines that words in the call transcript correspond to the particular topic by drawing a sample from the prior probability distribution or an augmented prior probability distribution. For example, the expected number of words on each call d associated with topic k may be computed as $\rho_{dk} = N_d * \theta_{dk}$. The server computer 110 may draw a sample from the distribution for the expected number of words on the call ($\rho_{dk}$) using any of the sampling techniques described further herein. The server computer 110 may then identify each unique word in the call transcript that matches the sample ($z_{kd}$) and identify the call transcript as including the particular topic only if the number of unique words in the call that matches the sample ($z_{kd}$) exceeds the word number threshold. As an example, the server computer 110 may determine whether each call transcript satisfies $|z_{kd}| \geq 3$. The same sample may be used for each call transcript and/or the server computer 110 may sample the prior distribution separately for a plurality of different call transcripts.

At step 906b, a positive value is stored for the identified call transcripts of step 906a. A positive value, as used herein, comprises a value used to indicate that the call transcript includes the particular topic. The positive value may be a Boolean value, such as True, an integer value, such as a "1", or any other type of value which can indicate that the call transcript contains the particular topic, such as a name of the topic. The positive value may be stored as part of the call transcript, such as in a metadata field, and/or in association with the call transcript, such as an index which uniquely identifies each call transcript and comprises a field for indicating whether the uniquely identified call transcripts comprise the particular topic. In other embodiments, the positive value comprises a location in which the call transcript is stored. For example, call transcripts that are identified in step 906a as comprising the particular topic may all be stored in a same folder.

At step 906c, call transcripts that do not include the particular topic are identified. The server computer 110 may identify call transcripts that include the call by comparing the proportion of words in the stored call transcript that exist in a particular topic with a threshold value and/or by evaluating one or more other criteria. The threshold value may be a same threshold value as used in step 906a, and may be an a priori expected proportion of words in the stored call transcript drawn from the particular topic multiplied by a second value corresponding to a length of a digitally recorded voice call corresponding to the digitally stored call transcript, or may be a different threshold value, such as a fixed proportion of the threshold value used in step 906a. As an example, the server computer 110 may evaluate the following expression:

$$\theta_{dk} < \alpha_k \left(\frac{\overline{N_d}}{N_d}\right)^{\frac{2}{3}}$$

and determine that the call transcript does not include the particular topic only if the above expression evaluates to true. Additionally or alternatively, the server computer 110 may compare words in the call to a sample from the distribution for the expected number of words on the call ($\rho_{dk}$) and determine whether any of the words on the call match the sample. In an embodiment, the server computer 110 only determines that the call transcript does not include the particular topic if none of the words on the call match the sample, i.e. $|z_{kd}|=0$.

In an embodiment, the server computer 110 evaluates additional criteria to determine whether call transcripts that would otherwise have been identified as not including the particular topic based on the above criteria should be identified as not including the particular topic in step 906c. For example, if a call transcript contains a topic that is identified as a duplicate of the particular topic, the server computer 110 may determine that the call transcript should not be identified as not including the particular topic in step 906c. For example, call transcripts may be evaluated as described in step 906a with respect to a plurality of different topics. The server computer 110 may identify topics as "duplicates" of the particular topic. If a call transcript is identified as not including the particular topic but is identified as including a topic that has been identified as a duplicate of the particular topic, the server computer 110 may determine that the call transcript should not be identified as not containing the particular topic in step 906c.

The server computer 110 may identify duplicate topics based on a first threshold number of a second threshold number of highest probability words in a particular topic existing in the second threshold number of highest probability words in a second topic. For instance, each topic corresponds to a probability distribution of words for the topic with each word having a corresponding probability of being sampled given the topic. The server computer 110 may identify fifteen (the second threshold value) words with the highest probability of being pulled from each topic. If two topics have at least three (the first threshold value) words of the top fifteen words that overlap, they may be identified as duplicate topics of each other.

In an embodiment, topics that have been identified as scripted topics are not identified as duplicate topics. For example, the server computer 110 may identify, of the plurality of topics, one or more scripted topics, such as by using the methods described in Section 6. If a topic is identified as a scripted topic, the server computer 110 may be configured to not treat the topic as a duplicate topic of the particular topic. In other words, the server computer 110 may only determine that the topic comprises a duplicate topic of the particular topic if the topic does not meet the criteria of a scripted topic.

At step 906d, a negative value is stored for the identified call transcripts of step 906c. A negative value, as used herein, comprises a value used to indicate that the call transcript does not include the particular topic. The negative value may be a Boolean value, such as False, an integer value, such as a "0", or any other type of value which can indicate that the call transcript does not contain the particular topic, such as an 'x' next to the name of the topic. The negative value may be stored as part of the call transcript, such as in a metadata field, and/or in association with the call transcript, such as an index which uniquely identifies each call transcript and comprises a field for indicating whether the uniquely identified call transcripts are identified to not comprise the particular topic. In other embodiments, the negative value comprises a location in which the call transcript is stored. For example, call transcripts that are identified in step 906c as not comprising the particular topic may all be stored in a same folder.

In an embodiment, transcripts that are not identified as meeting the criteria of step 906a or step 906c are removed from the input dataset. For example, the server computer 110 may generate the input training dataset using only call transcripts that have been stored with a positive value or negative value. The remaining call transcripts may be discarded when generating the input training datasets. Thus, call transcripts that are identified in step 906c but that are also identified to comprise a duplicate topic may also be removed from the input training dataset.

By performing steps 906a-906d, the server computer 110 generates an input training dataset for a supervised learning model. The input training dataset comprises inputs of the call transcripts and/or unique words spoken in the call transcripts and output values indicating whether the call transcripts included the particular topic. As the criteria for determining that a call includes the particular topic can differ from the criteria for determining that the call does not include the particular topic, call transcripts which are less definite in terms of inclusion of the particular topic are removed so that the input training dataset has higher accuracy.

In an embodiment, the server computer 110 performs the method of steps 906a-906d for a plurality of different topics. Thus, values may be stored for each call transcript that indicate, for each of a plurality of different topics, whether the call transcript is identified as comprising the topic, identified as not comprising the topic, or identified as unknown with respect to the topic.

At step 908, a supervised learning model is trained using the input dataset. The supervised learning model may comprise any machine learning system which is trained using unique values as inputs and binary classifiers as outputs. For example, a linear regression model may be trained with each unique word corresponding to a column of the training dataset, each call transcript corresponding to a row of the training dataset, and each value indicating whether a call corresponding to the row of the value includes the word corresponding to the column of the value. Additionally or alternatively, the value may indicate a number of times a word was spoken during a call. Other data, such as length of call, time of day in which the call occurred, or other metadata values from the call transcripts may additionally be used as part of the input training dataset. The server computer 110 may be configured to perform one or more post-processing steps to generate the input training dataset for the supervised learning model using the labeled call transcripts.

By using the methods herein, the server computer 110 is able to generate a training dataset for a supervised topic model using the output of an unsupervised topic model. By implementing the methods described herein, the server computer 110 is able to provide training datasets using a large number of call transcripts in a manner that could not be performed manually. Thus, the server computer 110 improves machine learning modeling techniques by providing methods for generating training datasets to train machine learning models. The supervised learning model can then be run with new call transcripts to determine whether a particular topic was discussed during the call. Additionally, the supervised model both approximates the topic model, performing faster computations, and translates the probabilistic outputs from the topic model into definite outcomes, allowing action to be taken when needed and removing the need for additional post processing analyses to provide outputs.

Figure 10:
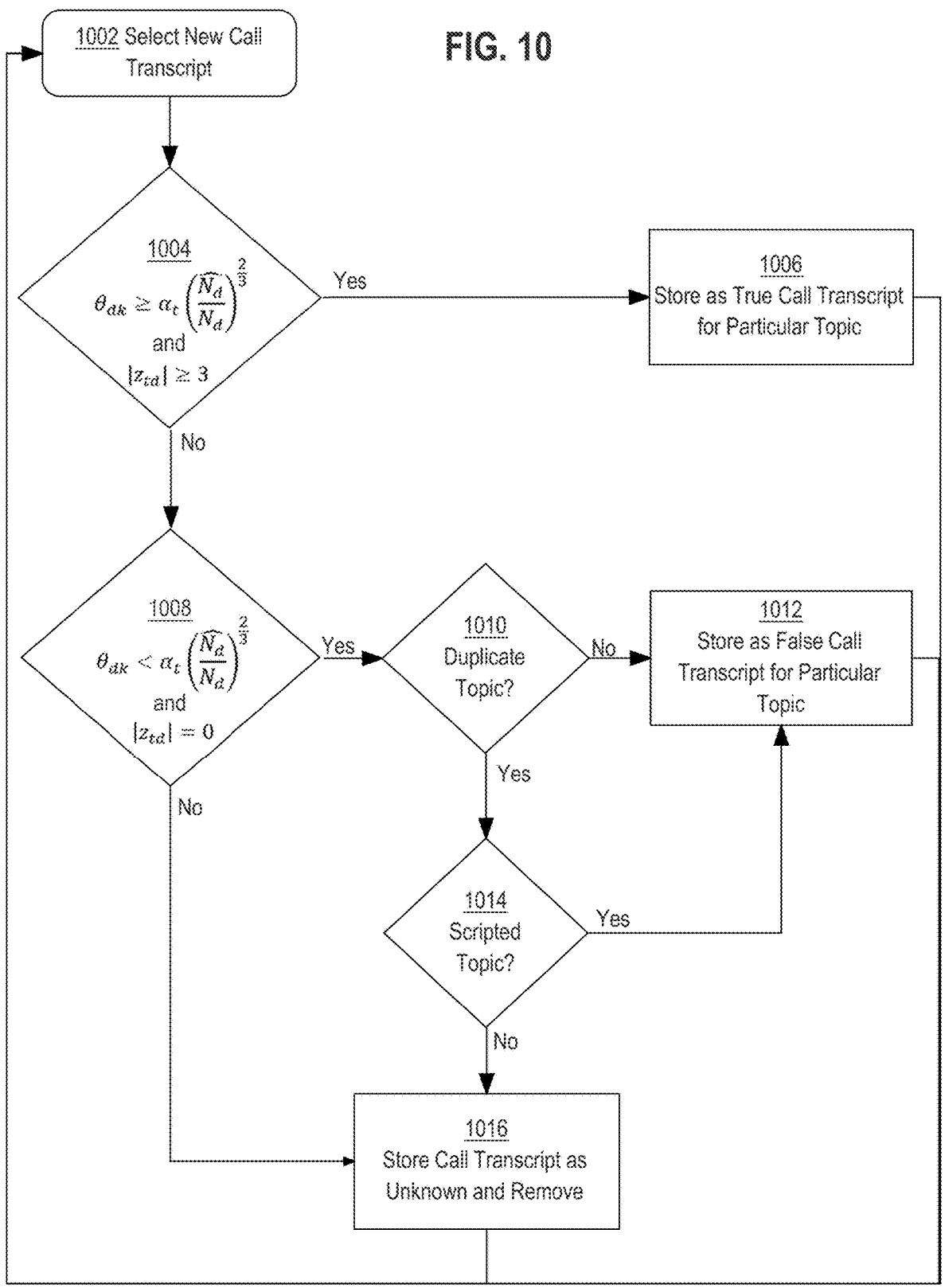
FIG. 10 provides an example method for generating an input training dataset for a supervised learning model using the output of an unsupervised model.

FIG. 10 provides an example method for generating an input training dataset for a supervised learning model using the output of an unsupervised model, such as those discussed in Section 4. The threshold values of FIG. 10 are provided for the purpose of providing a clear example and embodiments may use other threshold values for steps 1004 and 1006.

At step 1002, a new call transcript is selected. For example, the server computer 110 may perform the steps of FIG. 10 with a plurality of call transcripts and/or a plurality of topics. Each transcript may be evaluated individually based on the words in the transcript and the probability distributions for each topic.

At step 1004, one or more criteria are evaluated with respect to the call transcript to determine if the call transcript contains a particular topic. For example, the server computer 110 may determine whether the call transcript satisfies both equations of step 1004 in FIG. 10. If both equations are satisfied, at step 1006, the call transcript is saved as a "true" call transcript. Saving the call transcript as a "true" call transcript comprises saving data indicating that the call transcript should be used in the training dataset as a call transcript which includes the particular topic.

If one or more of the criteria of step 1004 are not satisfied, the server computer 110 may proceed to the evaluation of step 1008. In an embodiment, if one of the criteria of step 1004 is satisfied but one or more other criteria are not satisfied, the server computer 110 proceeds to step 1016, stores the call transcript as an "unknown" call transcript, and removes the call transcript from the input training dataset. In an embodiment, step 1016 comprises proceeding to the next call transcript at step 1002 without storing the call transcript as part of the input training dataset or without storing data identifying the particular topic with respect to the call transcript. Additionally or alternatively, digital data may be saved indicating that the call transcript is "unknown" with the respect to the particular topic and/or should not be used as part of an input training dataset for the particular topic.

At step 1008, one or more criteria are evaluated with respect to the call transcript to determine if the call transcript does not contain the particular topic. For example, the server computer 110 may determine whether the call transcript satisfies both equations of step 1006 in FIG. 10. If both equations are satisfied, the server computer 110 may proceed to the evaluations of step 1010. If one or more criteria are not satisfied, the server computer 110 may proceed to step 1016 where the call transcript is stored as unknown and removed from the training dataset.

At step 1010, if the call transcript meets the one or more criteria of step 1008, the server computer 110 determines if the call comprises a duplicate topic. For example, the server computer 110 may use the methods described herein to determine if the call transcript includes a topic that is a duplicate of the particular topic. As each topic is established after the unsupervised model is run, duplicate topics may be initially identified before the process of FIG. 10 or at any point during the process of FIG. 10. Thus, step 1010 may comprise accessing stored data indicating other topics against which the call transcript was evaluated and/or evaluating the call transcript against each topic that is identified as a duplicate of the particular topic. If the server computer 110 determines that the call transcript does not contain a duplicate topic, at step 1012, the server computer 110 saves the call transcript as a "false" call transcript. Saving the call transcript as a "false" call transcript comprises saving data indicating that the call transcript should be used in the training dataset as a call transcript which does not include the particular topic.

Additionally or alternatively, the server computer 110 may initially label the transcripts as "true" call transcripts, "false" transcripts, and "unknown" transcripts for each of a plurality of topics without performing steps 1010 or 1014, thereby continuing with step 1012 if the call transcript meets the one or more criteria of step 1008. After a plurality of topics have been evaluated for the plurality of call transcripts, the server computer 110 may evaluate each call transcript that was initially identified as "false" for the particular topic to determine if the call transcript includes a duplicate topic of the particular topic. If the call transcript does not contain a duplicate topic, at step 1012, the server computer 110 determines that the call transcript should still be stored as a "false" call transcript.

At step 1014, if the server computer 110 determines that the call does comprise a duplicate topic, the server computer 110 determines if the duplicate topic is a scripted topic. For example, the server computer 110 may evaluate the duplicate topic using the methods described in Section 6 to determine whether the duplicate topic is a scripted topic. If the duplicate topic is a scripted topic, at step 1012, the server computer 110 stores the call transcript as a "false" call transcript.

At step 1016, if the call transcript does not meet the criteria of steps 1004 or 1008 or the call transcript comprises a duplicate topic that is not a scripted topic, the server computer 110 stores the call transcript as an "unknown" call transcript and removes the call transcript from the input dataset.

After the call transcript is stored as a "true" call transcript in step 1006, a "false" call transcript in step 1012, or an "unknown" call transcript in step 1016, the server computer 110 proceeds to step 1002 and selects a new call transcript. The server computer 110 continues evaluating call transcripts until each call transcript has been evaluated and/or a threshold number of call transcripts have been evaluated, added to the input training dataset generally, added to the input training dataset as a "true" call transcript, and/or added to the input training dataset as a false call transcript. For example, the server computer 110 may stop evaluating call transcripts after all of the following occur: at least 1,000 call transcripts are evaluated, at least 400 call transcripts are stored as "true" call transcripts, and at least 400 call transcripts are stored as "false" call transcripts. In an embodiment, the server computer 110 generates the training dataset such that a minimum and/or maximum ratio of "true" call transcripts and "false" call transcripts is maintained. For example, the server computer 110 may not store a call transcript as a "true" call transcript if the server computer 110 has stored more than twice the number of "true" call transcripts as "false" transcripts. As another example, the server computer 110 may store a maximum threshold for "true" and/or "false" transcripts and may not store new transcripts as "true" and/or "false" transcripts once the maximum threshold is met. As a further example, after processing a plurality of call transcripts, the server computer 110 may remove call transcripts from the input training dataset until a particular ratio is met between "true" call transcripts and "false" call transcripts.

FIG. 10 provides a clear example of a process flow for generating an input training dataset. Other embodiments may include the steps of FIG. 10 performed in different orders. For example, the server computer 110 may evaluate whether a call transcript is a "false" call transcript before or in parallel to evaluating whether the call transcript is a "true" call transcript. As another example, the server computer 110 may evaluate each of a plurality of call transcripts to determine whether to identify them as "true" call transcripts and then evaluate each call transcript of the plurality of call transcripts which were not identified as "true" call transcripts to determine whether to identify them as false call transcripts.

8.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
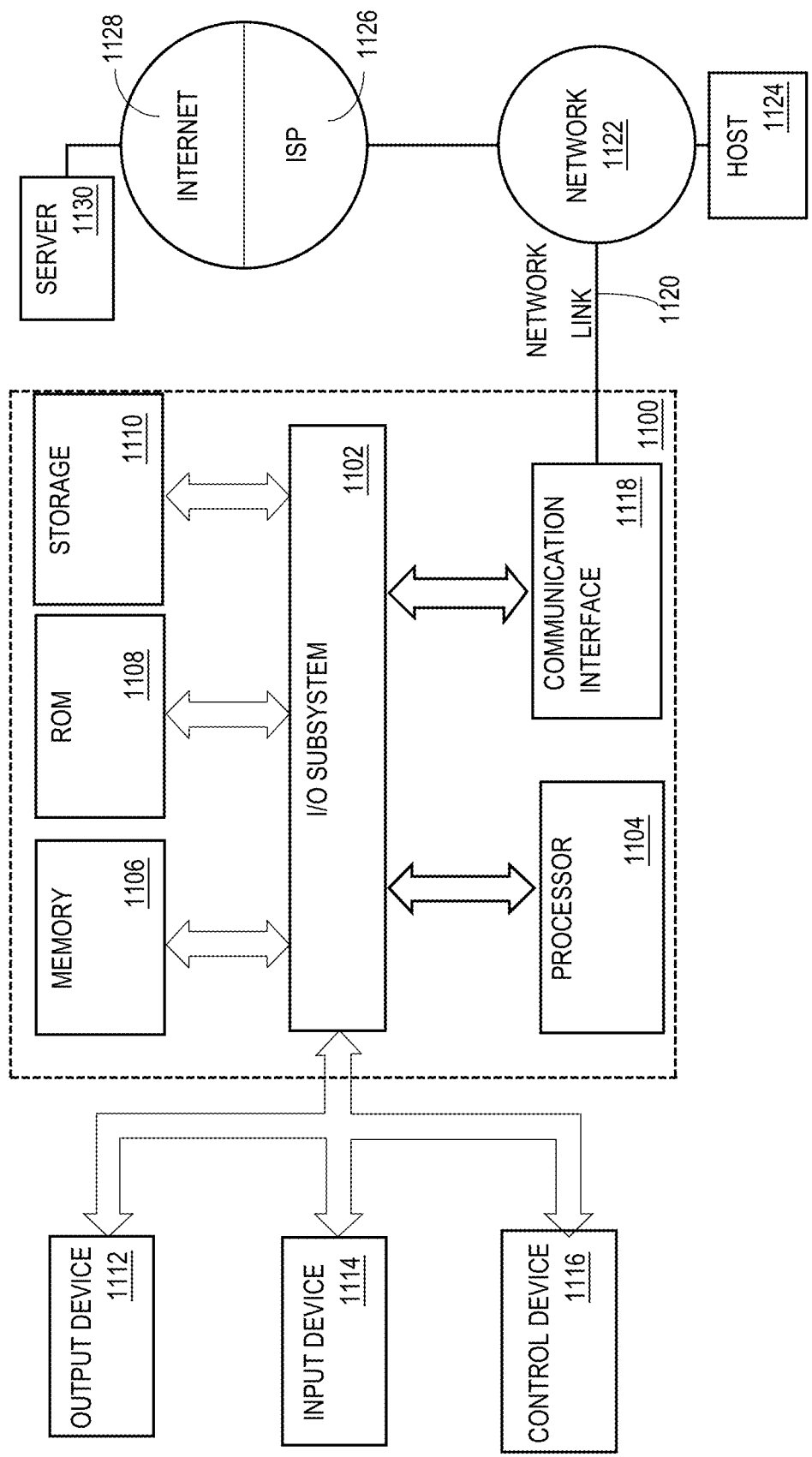
FIG. 11 is a block diagram that illustrates a computer system upon which an embodiment may be implemented.

For example, FIG. 11 is a block diagram that illustrates a computer system 1100 upon which an embodiment may be implemented. Computer system 1100 includes a bus 1102 or other communication mechanism for communicating information, and a hardware processor 1104 coupled with bus 1102 for processing information. Hardware processor 1104 may be, for example, a general-purpose microprocessor.

Computer system 1100 also includes a main memory 1106, such as a random-access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic, or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
   receiving a plurality of digitally stored call transcripts that have been prepared from digitally recorded voice calls;
   based on the call transcripts, creating and storing a topic model, the topic model simultaneously modeling topics for words in a call as a first function of one or more topic distributions for each topic of a plurality of topics that are used over a plurality of calls, and words of the call as a second function of call-specific probability distribution of words for each topic of the plurality of topics used over the plurality of calls;
   the one or more topic distributions modeling each of the one or more topic distributions as a third function of an inferred prior probability distribution that is modeled as a fourth function of a flat prior distribution;
   each call-specific probability distribution of words being modeled as a fifth function of a probability distribution of words that is modeled as a sixth function of an inferred prior distribution modeled as a seventh function of a flat prior distribution;
   based on output of the topic model, generating an input dataset for a supervised learning model by:
   identifying a first subset of the plurality of digitally stored call transcripts that include a particular topic, the first subset of the plurality of digitally stored call transcripts being stored with a positive out value;
   identifying a second subset of the plurality of digitally stored call transcripts that do not include the particular topic, the second subset of the plurality of digitally stored call transcripts being stored with a negative value;
   determining that a second topic of the plurality of topics corresponds to the particular topic by:
   determining that a particular probability distribution of words for the particular topic is greater than a second probability distribution for the second topic multiplied by a value corresponding to a length of the call;

identifying one or more digitally stored call transcripts of the second subset of the plurality of digitally stored call transcripts that include the second topic;

removing the one or more digitally stored call transcripts from the input dataset; and training the supervised learning model using the generated input dataset, wherein the supervised learning model is configured to compute, for a new digitally stored call transcript, a probability that the particular topic was discussed during a digitally recorded voice call corresponding to the new digitally stored call transcript.

2. The computer-implemented method of claim 1, further comprising, in determining that the particular probability distribution of words for the particular topic is greater than the second probability distribution for the second topic multiplied by a value corresponding to a length of the call, the value corresponding to the length of the call being calculated as $$\theta_{dk} \geq \alpha_k \left(\frac{\bar{N}_d}{N_d}\right)^{\frac{2}{3}}$$

where $\bar{N}_d$ is an average call length for the plurality of calls and $\theta_{dk}$ represents the second probability distribution.

3. The computer-implemented method of claim 2, further comprising determining whether the call transcript includes the particular topic by:

storing a word number threshold for a number of words in the call transcript that correspond to the particular topic;

determining that the number of words in the call transcript that correspond to the particular topic is greater than the word number threshold, and in response, determining that the call transcript includes the particular topic.

4. The computer-implemented method of claim 1, further comprising determining whether the call transcript includes the particular topic by:

storing a word number threshold for a number of words in the call transcript that correspond to the particular topic;

determining that the number of words in the call transcript that correspond to the particular topic is greater than the word number threshold, and in response, determining that the call transcript includes the particular topic.

5. The computer-implemented method of claim 1, further comprising determining that words in the call transcript correspond to the particular topic by drawing a sample from the second probability distribution or an augmented prior probability distribution.

6. The computer-implemented method of claim 5, further comprising:

calculating an expected number of words on each call d associated with topic k as $\rho_{dk} = N_d * \theta_{dk}$;

drawing a sample from a distribution for the expected number of words on the call ($\rho_{dk}$);

identifying each unique word in the call transcript that matches the sample ($z_{kd}$);

identifying the call transcript as including the particular topic only if the number of unique words in the call that matches the sample ($z_{kd}$) exceeds a word number threshold.

7. The computer-implemented method of claim 6, further comprising drawing a same sample for each call transcript.

8. A computer system comprising:

one or more hardware processors;

one or more non-transitory storage media coupled to the one or more hardware processors and storing one or more sequences of instructions which, when executed using the one or more hardware processors, cause the one or more hardware processors to execute:

receiving a plurality of digitally stored call transcripts that have been prepared from digitally recorded voice calls;

based on the call transcripts, creating and storing a topic model, the topic model simultaneously modeling topics for words in a call as a first function of one or more topic distributions for each topic of a plurality of topics that are used over a plurality of calls, and words of the call as a second function of call-specific probability distribution of words for each topic of the plurality of topics used over the plurality of calls;

the one or more topic distributions modeling each of the one or more topic distributions as a third function of an inferred prior probability distribution that is modeled as a fourth function of a flat prior distribution;

each call-specific probability distribution of words being modeled as a fifth function of a probability distribution of words that is modeled as a sixth function of an inferred prior distribution modeled as a seventh function of a flat prior distribution;

based on output of the topic model, generating an input dataset for a supervised learning model by:

identifying a first subset of the plurality of digitally stored call transcripts that include a particular topic, the first subset of the plurality of digitally stored call transcripts being stored with a positive out value;

identifying a second subset of the plurality of digitally stored call transcripts that do not include the particular topic, the second subset of the plurality of digitally stored call transcripts being stored with a negative value;

determining that a second topic of the plurality of topics corresponds to the particular topic by:

determining that a particular probability distribution of words for the particular topic is greater than a second probability distribution for the second topic multiplied by a value corresponding to a length of the call;

identifying one or more digitally stored call transcripts of the second subset of the plurality of digitally stored call transcripts that include the second topic;

removing the one or more digitally stored call transcripts from the input dataset; and training the supervised learning model using the generated input dataset, wherein the supervised learning model is configured to compute, for a new digitally stored call transcript, a probability that the particular topic was discussed during a digitally recorded voice call corresponding to the new digitally stored call transcript.

9. The computer system of claim 8, further comprising sequences of instructions which, when executed using the one or more hardware processors, cause the one or more hardware processors to execute, in determining that the particular probability distribution of words for the particular topic is greater than the second probability distribution for the second topic multiplied by a value corresponding to a length of the call, the value corresponding to the length of the call being calculated as $$\theta_{dk} \geq \alpha_k \left(\frac{\overline{N_d}}{N_d}\right)^{\frac{2}{3}}$$

where $\overline{N_d}$ is an average call length for the plurality of calls and $\theta_{dk}$ represents the second probability distribution.

10. The computer system of claim 9, further comprising sequences of instructions which, when executed using the one or more hardware processors, cause the one or more hardware processors to execute determining whether the call transcript includes the particular topic by:
   storing a word number threshold for a number of words in the call transcript that correspond to the particular topic;
   determining that the number of words in the call transcript that correspond to the particular topic is greater than the word number threshold, and in response, determining that the call transcript includes the particular topic.

11. The computer system of claim 8, further comprising sequences of instructions which, when executed using the one or more hardware processors, cause the one or more hardware processors to execute determining whether the call transcript includes the particular topic by:
   storing a word number threshold for a number of words in the call transcript that correspond to the particular topic;
   determining that the number of words in the call transcript that correspond to the particular topic is greater than the word number threshold, and in response, determining that the call transcript includes the particular topic.

12. The computer system of claim 8, further comprising sequences of instructions which, when executed using the one or more hardware processors, cause the one or more hardware processors to execute determining that words in the call transcript correspond to the particular topic by drawing a sample from the second probability distribution or an augmented prior probability distribution.

13. The computer system of claim 12, further comprising sequences of instructions which, when executed using the one or more hardware processors, cause the one or more hardware processors to execute:
   calculating an expected number of words on each call d associated with topic k as $\rho_{dk}=N_d*\theta_{dk}$;
   drawing a sample from a distribution for the expected number of words on the call ($\rho_{dk}$);
   identifying each unique word in the call transcript that matches the sample ($z_{kd}$);
   identifying the call transcript as including the particular topic only if the number of unique words in the call that matches the sample ($z_{kd}$) exceeds a word number threshold.

14. The computer system of claim 13, further comprising sequences of instructions which, when executed using the one or more hardware processors, cause the one or more hardware processors to execute drawing a same sample for each call transcript.

* * * * *